US012041214B2

(12) United States Patent
Kamihisa

(10) Patent No.: US 12,041,214 B2
(45) Date of Patent: Jul. 16, 2024

(54) IMAGE FORMING APPARATUS FOR ESTABLISHING A CONNECTION WITH A TERMINAL DEVICE USING QUICK UDP INTERNET CONNECTIONS (QUIC), TERMINAL DEVICE FOR ESTABLISHING A CONNECTION WITH AN IMAGE FORMING APPARATUS USING QUIC AND CONTROL METHODS OF THOSE

(71) Applicant: SHARP KABUSHIKI KAISHA, Sakai (JP)

(72) Inventor: Sho Kamihisa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/892,605

(22) Filed: Aug. 22, 2022

(65) Prior Publication Data

US 2023/0082319 A1 Mar. 16, 2023

(30) Foreign Application Priority Data

Sep. 15, 2021 (JP) ................................. 2021-150570

(51) Int. Cl.
*H04N 1/44* (2006.01)
*G06F 3/12* (2006.01)
*H04L 9/40* (2022.01)
*H04N 1/327* (2006.01)

(52) U.S. Cl.
CPC ......... *H04N 1/4413* (2013.01); *G06F 3/1209* (2013.01); *G06F 3/1222* (2013.01); *G06F 3/1236* (2013.01); *G06F 3/1238* (2013.01); *H04L 63/0428* (2013.01); *H04L 63/166* (2013.01); *H04N 1/32747* (2013.01)

(58) Field of Classification Search
None
See application file for complete search history.

(56) References Cited

U.S. PATENT DOCUMENTS

| 2009/0316206 | A1* | 12/2009 | Anezaki | H04N 1/32641 358/1.15 |
| 2021/0014328 | A1* | 1/2021 | Singhal | H04L 69/16 |
| 2021/0045186 | A1* | 2/2021 | Fu | H04L 9/3236 |

FOREIGN PATENT DOCUMENTS

JP 2010-003175 A 1/2010

* cited by examiner

*Primary Examiner* — Haris Sabah
(74) *Attorney, Agent, or Firm* — ScienBiziP, P.C.

(57) ABSTRACT

An image-forming apparatus includes a controller, a storage, and a communicator. The controller establishes a connection with a terminal device through the communicator by QUIC, stores, in the storage, identification information for identifying the connection and key information to be used for encryption of transmission/reception information transmitted and received to and from the terminal device, performs communication of the transmission/reception information with the terminal device through HTTP/3, and establishes, when the connection with the terminal device is disconnected, a connection with the terminal device using the identification information and the key information so that the communication of the transmission/reception information with the terminal device is resumed.

10 Claims, 23 Drawing Sheets

FIG. 3

| MULTIFUNCTION PERIPHERAL NAME | ADDRESS | TERMINAL DEVICE Connection ID | MULTIFUNCTION PERIPHERAL Connection ID | KEY INFORMATION |
|---|---|---|---|---|
| x x x x | 192.168.0.11 | 9dc9001122334455 | 8ba9001122334455 | ***** |
| y y y y | 192.168.0.12 | 5c01556677889900 | 33dc998877665544 | ***** |
| ... | ... | ... | ... | ... |

FIG. 5

| JOB ID | ADDRESS | PORT NUMBER | TERMINAL DEVICE Connection ID | MULTIFUNCTION PERIPHERAL Connection ID | KEY INFORMATION | OPERATION INFORMATION/JOB INFORMATION | JOB STATUS |
|---|---|---|---|---|---|---|---|
| 25 | 192.168.0.101 | 19999 | 9dc90011223344455 | 8ba90011223344455 | ***** | SIMPLE COPY<br>PAPER:A4<br>COLOR MODE: COLOR<br>PROCESSING<br>DATA:20210801170000 | NOT EXECUTED |
| 24 | 192.168.0.102 | 19998 | 1dc20006677889900 | 223c9911223344455 | ***** | SCAN<br>MAGNIFICATION:100%<br>COLOR MODE: COLOR<br>PROCESSING<br>DATA:20210801150000 | EXECUTED |
| ... | ... | ... | ... | ... | ... | ... | ... |

IMAGE FORMING APPARATUS FOR ESTABLISHING A CONNECTION WITH A TERMINAL DEVICE USING QUICK UDP INTERNET CONNECTIONS (QUIC), TERMINAL DEVICE FOR ESTABLISHING A CONNECTION WITH AN IMAGE FORMING APPARATUS USING QUIC AND CONTROL METHODS OF THOSE

BACKGROUND OF THE INVENTION

Field of the Invention

The present disclosure relates to an image-forming apparatus and the like.

Description of the Background Art

In general, remote operation technologies have been used to operate, from a terminal device, such as a mobile terminal, a so-called multifunction peripheral having a copying function, a scanning function, and a document printing function.

Furthermore, technologies have been proposed to improve usability during a remote operation. For example, an image processing apparatus that stores, when wireless communication with a mobile terminal is interrupted while data to be processed that is transferred from the mobile terminal is received, information on an interrupted job including unique information (a telephone number) of the mobile terminal and resumes the wireless communication with the mobile terminal when a telephone number of a mobile terminal connected after the interruption coincides with the telephone number included in the information on the interrupted job has been proposed.

In order to resume communication between a multifunction peripheral and a terminal device using the technology described as the related art, mobile-unique information, such as a telephone number, and print information (including a location for storing printing data and print settings)) are required to be transmitted from the terminal device to the multifunction peripheral that stores the information. Therefore, there arises a problem in that personal information, such as a telephone number, and print information are leaked due to a malicious attack (such as interception of communication). Furthermore, it is possible that the mobile-unique information, such as a telephone number, is known by a third party, and therefore, there is concern that print data may be leaked due to spoofing.

The present disclosure is made in view of the above problems, and an object of the present disclosure is to provide an image-forming apparatus capable of securely resuming communication with a terminal device.

SUMMARY OF THE INVENTION

According to an aspect of the present disclosure, an image-forming apparatus includes a controller, a storage, and a communicator. The controller establishes a connection with a terminal device through the communicator by QUIC, stores, in the storage, identification information for identifying the connection and key information to be used for encryption of transmission/reception information transmitted and received to and from the terminal device, performs communication of the transmission/reception information with the terminal device through HTTP/3, and establishes, when the connection with the terminal device is disconnected, a connection with the terminal device using the identification information and the key information so that the communication of the transmission/reception information with the terminal device is resumed.

According to another aspect of the present disclosure, a terminal device includes a controller, a storage, and a communicator. The controller establishes a connection with an image-forming apparatus through the communicator by QUIC, stores, in the storage, identification information for identifying the connection and key information to be used for encryption of transmission/reception information transmitted and received to and from the image-forming apparatus, performs communication of the transmission/reception information with the image-forming apparatus through HTTP/3, and performs, when the connection with the image-forming apparatus is disconnected, a reconnection to the image-forming apparatus using the identification information and the key information so as to resume the communication of the transmission/reception information with the image-forming apparatus.

According to a further aspect of the present disclosure, a method for controlling an image-forming apparatus includes establishing a connection with a terminal device by QUIC, storing identification information for identifying the connection and key information to be used for encryption of transmission/reception information transmitted and received to and from the terminal device, performing communication of the transmission/reception information with the terminal device through HTTP/3, and establishing, when the connection with the terminal device is disconnected, a connection with the terminal device using the identification information and the key information so that the communication of the transmission/reception information with the terminal device is resumed.

According to a still further aspect of the present disclosure, a method for controlling a terminal device includes establishing a connection with an image-forming apparatus by QUIC, storing identification information for identifying the connection and key information to be used for encryption of transmission/reception information transmitted and received to and from the image-forming apparatus, performing communication of the transmission/reception information with the image-forming apparatus through HTTP/3, and performing, when the connection with the image-forming apparatus is disconnected, a reconnection to the image-forming apparatus using the identification information and the key information so that the communication of the transmission/reception information with the image-forming apparatus is resumed.

According to the present disclosure, an image-forming apparatus capable of securely resuming communication with a terminal device may be provided.

BRIEF DESCRIPTION OF THE DRAWINGS

FIG. 3 is a table illustrating an example of a data structure of information on a multifunction peripheral according to the first embodiment.

FIG. 5 is a table illustrating an example of a data structure of job detailed information according to the first embodiment.

DESCRIPTION OF THE PREFERRED EMBODIMENTS

Hereinafter embodiments of the present disclosure will be described with reference to the accompanying drawings. Note that the following embodiments are merely examples for illustrating the present disclosure, and the technical scope of the disclosure described in the claims is not limited to the following descriptions.

1. First Embodiment

1.1 Overall Configuration

Figure 1:
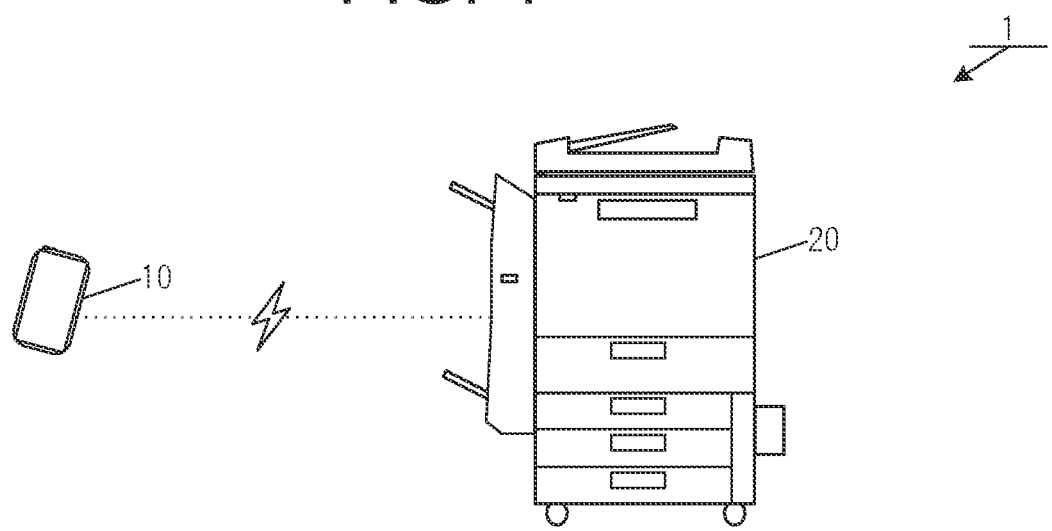
FIG. 1 is a diagram illustrating an overall configuration of a system according to a first embodiment.

An overall configuration of a system 1 according to a first embodiment will be described with reference to FIG. 1. As illustrated in FIG. 1, the system 1 includes a terminal device 10 and a multifunction peripheral 20, The terminal device 10 and the multifunction peripheral 20 can be connected to each other via a wireless LAN (Local Area Network), for example. The terminal device 10 and the multifunction peripheral 20 may be connected to each other directly or via a wireless access point.

The terminal device 10 is an information processing apparatus carried by a user. The terminal device 10 is an apparatus, such as a smartphone, a tablet, a PC (Personal Computer).

The multifunction peripheral 20 is an information processing apparatus having a copying function, a scanning function, a document printing function, and the like and is also referred to as an MFP (Multi-Function Printer/Peripheral). The multifunction peripheral 20 may be an image processing apparatus that processes images or an image-forming apparatus including a device that forms images on recording sheets using an electrophotographic device or the like.

In this embodiment, when an operation or a job (a print job or a transmission job) is performed by the terminal device 10 on the multifunction peripheral 20, QUIC (Quick UDP Internet Connections) used as a communication protocol (a transport protocol) for a connection between the terminal device 10 and the multifunction peripheral 20. QUIC is a protocol that uses UDP (User Datagram Protocol) to perform a bidirectional connection between two devices. The two devices that have established a connection by QUIC transmit a UDP packet constituted by incorporating a QUIC packet in a UDP payload. The QUIC packet includes a QUIC packet header and a payload having predetermined information.

Although UDP is a connectionless protocol, the QUIC packet header includes identification information (Connection ID, for example) to be used for identification of a connection, and therefore, the two devices that have established a QUIC connection can identify the connection based on the identification information. Since the connection is identified based on the identification information, even when IP (Internet Protocol) addresses or port numbers of the devices establishing the connection change, the two devices establishing the connection can still maintain the connection between the devices.

Furthermore, the payload in the QUIC packet is encrypted. As key information used to encrypt and decrypt the encrypted payload, a common key shared by the devices that, have established the connection via QUIC is used. The common key is generated in the two devices to establish a connection when a process of establishing the connection by QUIC is executed.

In addition, the terminal device 10 and the multifunction peripheral 20 transfer (transmit/receive) information about remote operations and job execution (transmission/reception information). For example, HTTP/3 that is a type of EMIT (Hypertext Transfer Protocol) is used to transfer the transmission/reception information.

Examples of the transmission/reception information include operation information and job information to be transmitted from the terminal device 10 to the multifunction peripheral 20 and operation screen information WI data) to be transmitted from the multifunction peripheral 20 to the terminal device 10. The operation information indicates content of an operation input by a user. Furthermore, the job information indicates content of a job. The job information may include data (processing data) to be subjected to a predetermined process, such as printing or transmission, performed by the multifunction peripheral 20 during job execution. The terminal device 10 may transmit only the job information to the multifunction peripheral 20 or transmit the operation information and the processing data. The operation screen information is used to display a screen for accepting operations performed by the user. Note that the transmission/reception information may be any information that causes the multifunction peripheral 20 to perform a given job.

The terminal device 10 operates the multifunction peripheral 20 by transmitting the transmission/reception information, such as the operation information or the job information, to the multifunction peripheral 20. Note that an operation performed by the terminal device 10 communicating with the multifunction peripheral 20 is also referred to as a remote operation.

1.2 Functional Configuration

1.2.1 Terminal Device

Figure 2:
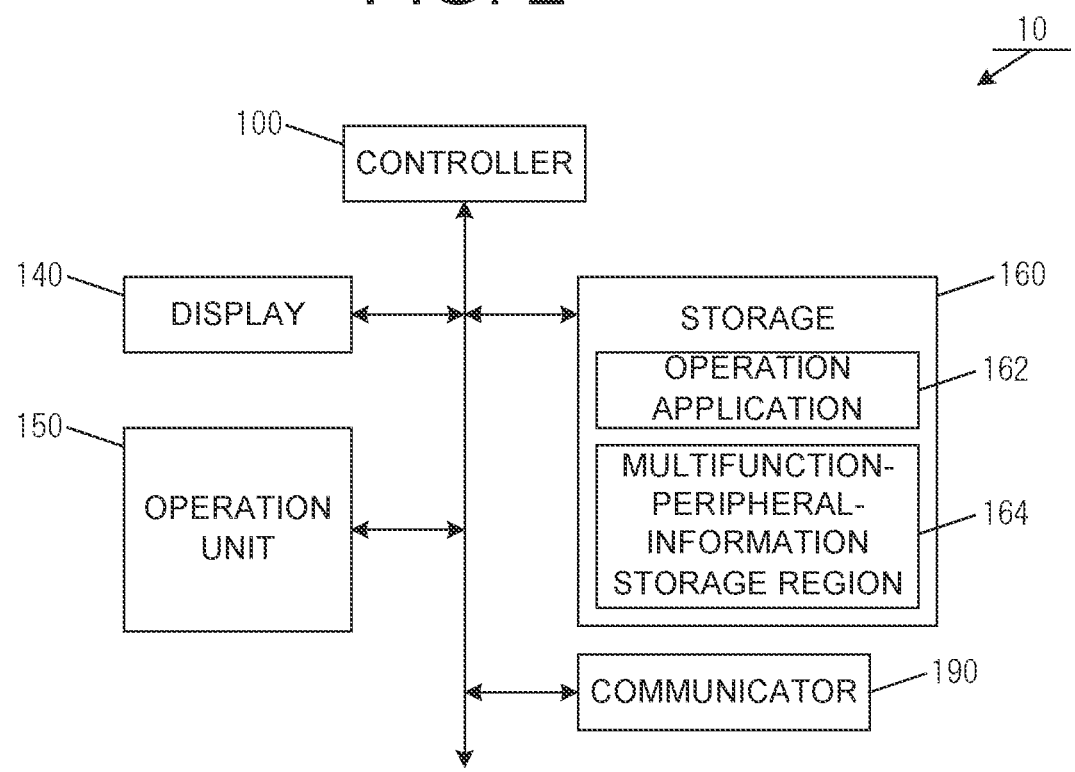
FIG. 2 is a diagram illustrating a functional configuration of a terminal device according to the first embodiment.

A functional configuration of the terminal device 10 will be described with reference to FIG. 2. As illustrated in FIG. 2, the terminal device 10 includes a controller 100, a display 140, an operation unit 150, a storage 160, and a communicator 190.

The controller 100 controls the entire terminal device 10. The controller 100 reads and executes various programs stored in the storage 160 to realize various functions and includes one or more computing devices (such as a CPU (Central Processing Unit)). Furthermore, the controller 100 may also be configured as an SoC (System on a Chip) having a plurality of functions among those described below.

The display 140 displays various information. The display 140 is composed of, for example, an LCD (Liquid Crystal Display), an organic EL (electro-luminescence) display, a micro-LED (Light Emitting Diode) display, or the like.

The operation unit 150 accepts an operation performed by the user using the terminal device 10. The operation unit 150 is composed of an input device, such as a touch sensor. The method for detecting an input with the touch sensor may be any typical detection method, such as a resistive method, an infrared method, an inductive method, or a capacitive method. Note that a touch panel configured such that the display 140 and the operation unit 150 are integrally formed may be installed in the terminal device 10.

The storage 160 stores various programs and various data required for operating the terminal device 10. The storage 160 includes, for example, a storage device, such as an SSD (Solid State Drive) which is a semiconductor memory or an HDD (Hard Disk Drive).

The storage 160 stores an operation application 162 and ensures a multifunction-peripheral-information storage region 164 as a storage region.

The operation application 162 allows the controller 100 to realize functions for remotely operating the multifunction peripheral 20. For example, the operation application 162 causes the controller 100 to realize a function of displaying a screen to be used in a remote operation on the display 140 and a function associated with a connection with the multifunction peripheral 20 or a communication of information.

The multifunction-peripheral-information storage region 164 stores information associated with the multifunction peripheral 20 (multifunction peripheral information). The multifunction peripheral information includes, as illustrated in FIG. 3, for example, a name of the multifunction peripheral 20 (e.g., "xxxx"), an address of the multifunction peripheral 20 (e.g., "192.168.0.11"), terminal device Connection ID for identifying a connection with the multifunction peripheral 20 (e.g., "9dc9001122334455"), multifunction peripheral Connection ID (e.g., "8ba9001122334455"), and key information to be used to encrypt information transmitted or received by the multifunction peripheral 20 (e.g., "******").

The address is information used to identify the multifunction peripheral 20 connected to a network to which the terminal device 10 is connected, and is used for a connection to the multifunction peripheral 20. The address is, for example, an IP address.

Connection ID is information (identification information) used to identify a connection between the terminal device 10 and the multifunction peripheral 20. In this embodiment, terminal device Connection ID and multifunction peripheral Connection ID are stored as Connection IDs. The terminal device Connection ID is used when the multifunction peripheral 20 communicates with the terminal device 10. Furthermore, the multifunction peripheral Connection ID is used when the terminal device 10 communicates with the multifunction peripheral 20.

The key information is, for example, information on a common key used for communication by TLS (Transport Layer Security) protocol (TLS key information).

In addition to the information described above, the multifunction peripheral information may include information on a port number and the like of the multifunction peripheral 20.

The communicator 190 communicates with an external apparatus, such as the multifunction peripheral 20. The communicator 190 is constituted by a communication device having a function of connecting to a wireless LAN by a method based on the IEEE 802.11b/g/n standards, for example. The communicator 190 is constituted by an NIC (Network Interface Card) and a communication module connectable to an LTE (Long-Term Evolution)/LTE-A (LTE-Advanced)/LAA (License-Assisted Access using LTE)/5G line, for example.

1.2.2 Multifunction Peripheral

Figure 4:
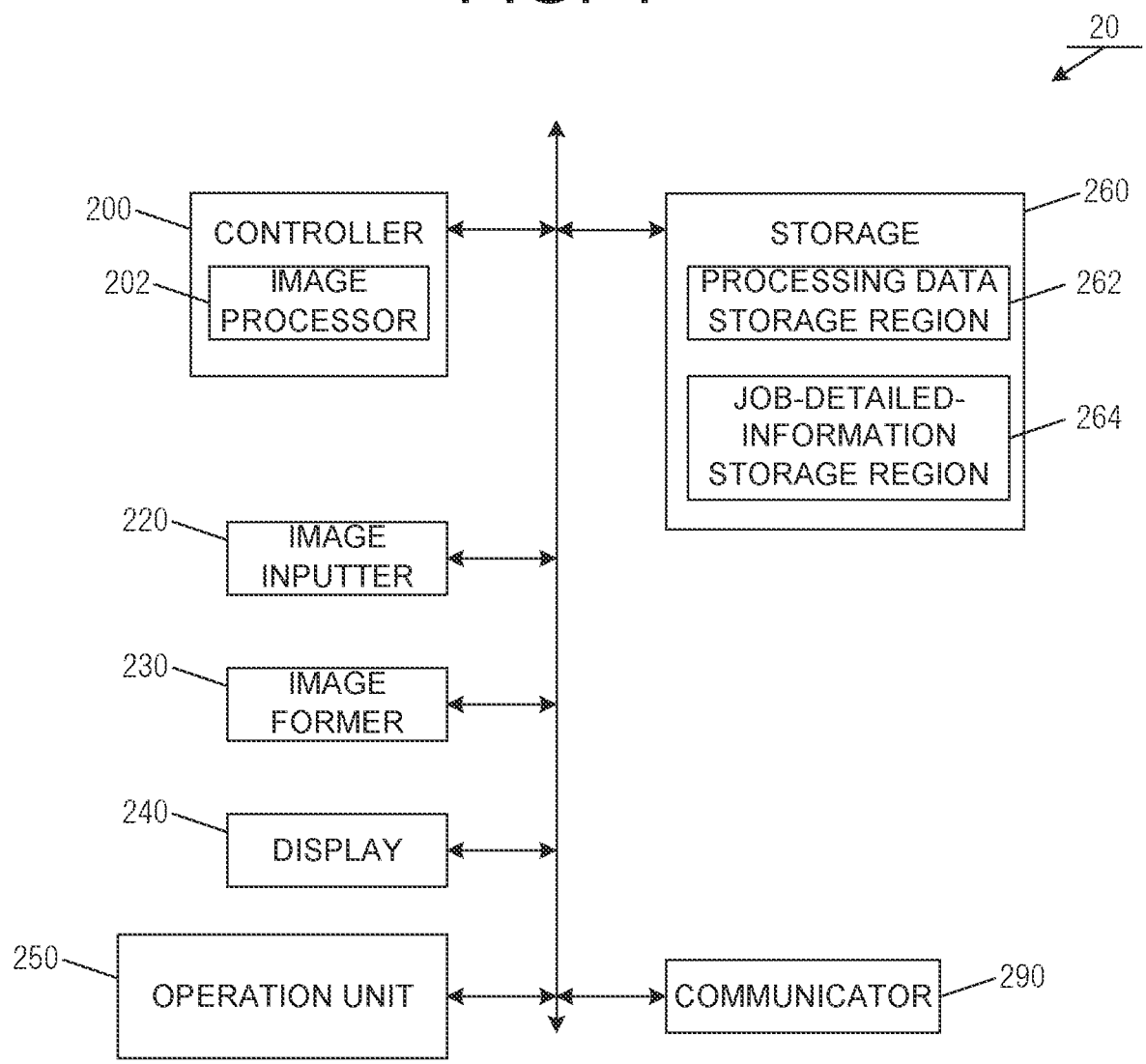
FIG. 4 is a diagram illustrating a functional configuration of the multifunction peripheral according to the first embodiment.

A functional configuration of the multifunction peripheral 20 will be described with reference to FIG. 4. As illustrated in FIG. 4, the multifunction peripheral 20 includes a controller 200, an image inputter 220, an image former 230, a display 240, an operation unit 250, a storage 260, and a communicator 290.

The controller 200 controls the entire multifunction peripheral 20. The controller 200 reads and executes various programs stored in the storage 260 to realize various functions and includes one or more computing devices (such as a CPU). The controller 200 may be configured as an SoC having a plurality of functions among those described below.

The controller 200 executes the programs stored in the storage 260 thereby to function as an image processor 202. The image processor 202 performs various image processes on image data input by the image inputter 220. For example, the image processor 202 performs a sharpening process and a color conversion process on image data.

The image inputter 220 reads a document and inputs data on a read image. For example, the image inputter 220 includes a scan device or the like which includes a device that converts optical information into electrical signals, such as a CIS (Contact Image Sensor) or a CCD (Charge Coupled Device), and reads a document placed on a placement table of the multifunction peripheral 20.

The image former 230 forms (prints) an image on a recording medium, such as a recording sheet. The image former 230 is composed of, for example, a laser printer using an electrophotographic method.

The display 240 displays various information. The display 240 is composed of, for example, an LCD, an organic EL display, a micro LED display, or any other display.

The operation unit 250 accepts an operation performed by the user using the multifunction peripheral 20. The operation unit 250 includes input devices, such as a hardware key (a physical key or a numeric keypad) and a touch sensor. Note that a touch panel configured such that the display 240 and the operation unit 250 are integrally formed may be installed in the multifunction peripheral 20.

The storage 260 stores various programs and various data required for operation of the multifunction peripheral 20. The storage 260 includes; for example, a storage device; such as an SSD which is a semiconductor memory or an HDD.

The storage 260 ensures a processing-data storage region 262 and a job-detailed-information storage region 264 as storage regions.

The processing-data storage region 262 stores data processed by the multifunction peripheral 20. Examples of the processing data include data representing an image formed by the image former 230 and data to be transmitted to another apparatus through the communicator 290.

The job-detailed-information storage region 264 stores detailed information on a job to be executed by the multifunction peripheral 20 (job detailed information). For example, as illustrated in FIG. 5, the job detailed information includes a job ID (e.g., "25") that identifies a job, an address of the terminal device 10 (e.g., "192.168.0.101"), a port number for communication with the terminal device 10 (e.g., "19999"), terminal device Connection ID (e.g., "9dc9001122334455") and multifunction peripheral Connection ID (e.g., "8ba9001122334455") to be used for communication with the terminal device 10, key information (e.g., "******") used to encrypt information to be transmitted to the terminal device 10, operation information and job information (e.g., "simple copy, paper: A4, color mode: color, processing data: 20210801170000") that are transmission/reception information received from the terminal device 10, and a job status (e.g., "Not Executed").

The processing data may be stored in the job detailed information or the processing-data storage region 262. In the case where the processing data is stored in the processing-data storage region 262, the job detailed information stores information for specifying the processing data stored in the processing-data storage region 262 (e.g., a data name).

The address is, for example, an IP (Internet Protocol) address. The job status stores information indicating a status of progress of a job, such as "Not Executed," "Executing," and "Executed". Note that information other than the information described above may be included in the job detailed information.

The communicator 290 communicates with an external apparatus, such as the terminal device 10. The communicator 290 is composed of a communication device (a communication module) similar to the communicator 190.

1.3 Processing Flow 1.3.1 Outline of Processing

Figure 6:
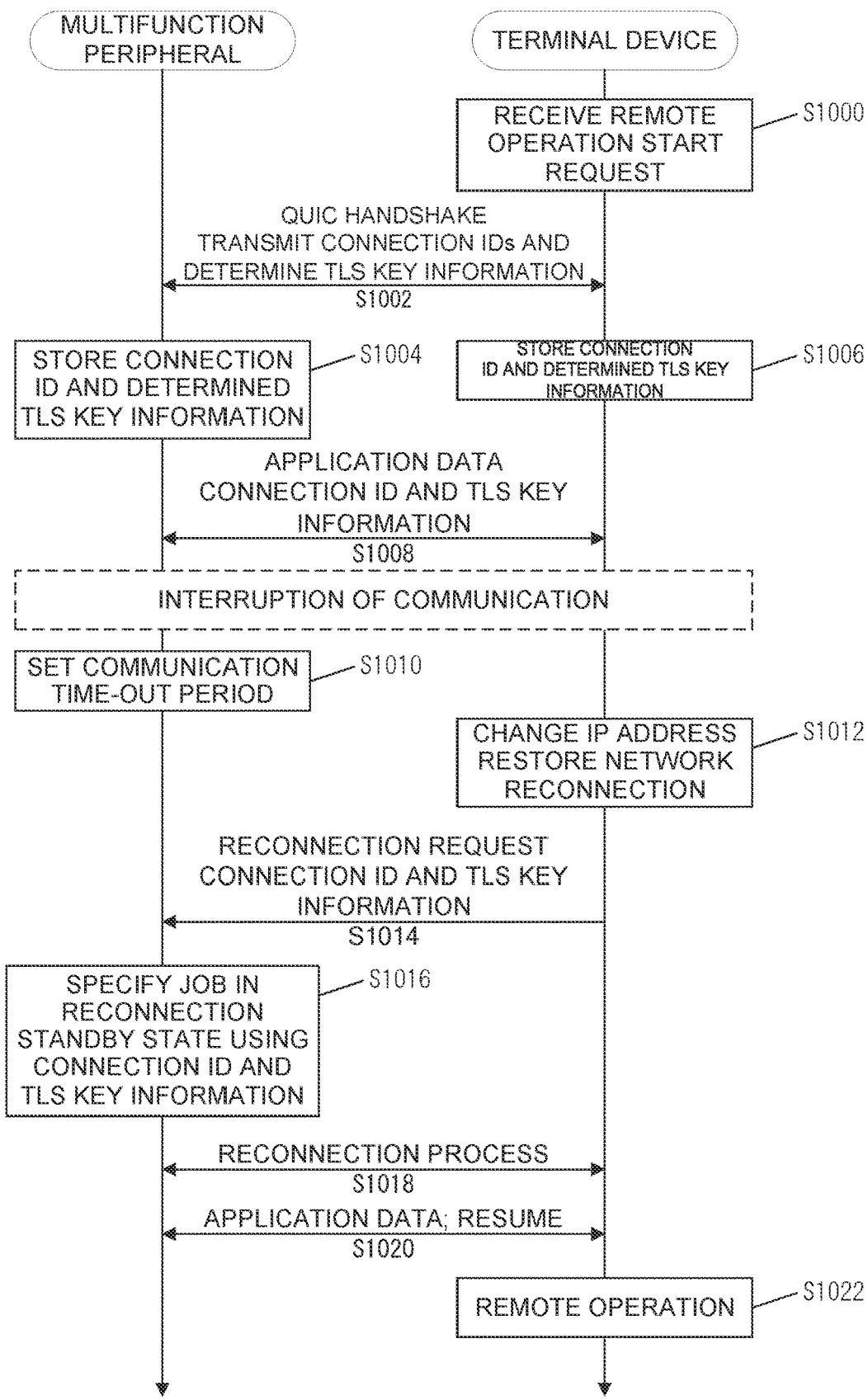
FIG. 6 is a sequence diagram illustrating a flow of a process according to the first embodiment.

An outline of a process performed by the terminal device 10 and the multifunction peripheral 20 will be described with reference to FIG. 6. First, the terminal device 10 receives a request for starting a remote operation of the multifunction peripheral 20 (S1000). Then, handshake based on a QUIC protocol (QUIC Handshake) is performed between the terminal device 10 and the multifunction peripheral 20 (S1002). By this, a session between the terminal device 10 and the multifunction peripheral 20 is started. In step S1002, the terminal device 10 and the multifunction peripheral 20 execute the following process.

(1) Generation and Transmission of Connection IDs

The terminal device 10 generates terminal device Connection ID to be transmitted to the multifunction peripheral 20. The multifunction peripheral 20 generates multifunction peripheral. Connection ID to be transmitted to the terminal device 10. In this way, the Connection IDs are shared between the terminal device 10 and the multifunction peripheral 20.

(2) Determination of TLS Common Key

The terminal device 10 and the multifunction peripheral 20 each generate a common key using information transmitted and received at a time of the handshake. When the terminal device 10 and the multifunction peripheral 20 confirm that the same common key has been generated, the common key is determined as TLS key information. For example, when each of the terminal device 10 and the multifunction peripheral 20 can transmit data encrypted using the common key and decrypt the data received from the other device using the common key, it can be determined that the same common key has been generated.

When the handshake is performed, a connection between the terminal device 10 and the multifunction peripheral 20 is established and a session is started (established). At the start of the session, the multifunction peripheral 20 stores the Connection ID and the TLS key information used in the QUIC protocol (S1004). Similarly, at the start of the session, the terminal device 10 stores the Connection ID and the TLS key information used in the QUIC protocol (S1006).

Then, the terminal device 10 and the multifunction peripheral 20 perform communication of transmission/reception information (Application data) using the Connection IDs and TLS key information (S1008).

For example, the multifunction peripheral 20 encrypts information on an operation screen (UI data) using the TLS key information. Furthermore, the multifunction peripheral 20 transmits the encrypted information and the Connection ID (the terminal device Connection ID received from the terminal device 10, for example) for identifying the connection to the terminal device 10 to the terminal device 10. The terminal device 10 decrypts the information received from the multifunction peripheral 20 using the TLS key information corresponding to the multifunction peripheral 20, displays an operation screen based on the received information on the display 140, and accepts an input of an operation performed by the user.

Furthermore, the terminal device 10 encrypts operation information and job information using the TLS key information and transmits the encrypted operation information and the encrypted job information to the multifunction peripheral 20, The multifunction peripheral 20 decrypts the operation information and the job information using the TLS key information corresponding to the terminal device 10 and stores the decrypted operation information and the decrypted job information that are associated with the Connection ID and the TLS key information associated with the communication with the terminal device 10.

The following describes a case where the terminal device 10 and the multifunction peripheral 20 are disconnected from each other, the session is interrupted, and the communication is interrupted. The disconnection may be caused, for example, by a network failure in wireless communication on the terminal device 10 side or a change in an IP address of the terminal device 10 due to a change in a base station to which the terminal device 10 is connected.

When the communication between the terminal device 10 and the multifunction peripheral 20 is interrupted, the multifunction peripheral 20 sets a communication time-out period (S1010). The communication time-out period is a period in which a reconnection from the terminal device 10 is accepted. The multifunction peripheral 20 maintains a state in which a reconnection from the terminal device 10 is acceptable (a communication acceptable state) until the communication time-out period elapses. On the other hand, after the communication time-out period has elapsed, the multifunction peripheral 20 rejects reconnection from the terminal device 10 (does not reconnect to terminal device 10) so as to reduce consumption of resources of the multifunction peripheral 20 (e.g., memory) and to avoid a prolonged state in which another user may not operate the multifunction peripheral 20.

Furthermore, the terminal device 10 performs a reconnection to the multifunction peripheral 20 when a change in the IP address is completed or when the network is restored (S1012). For example, the terminal device 10 performs a reconnection request by transmitting, to the multifunction peripheral 20, the multifunction peripheral Connection ID and information obtained by encrypting predetermined information using the TLS key information (S1014).

The multifunction peripheral 20 specifies a job in a reconnection standby state using the Connection ID received from the terminal device 10 and the TLS key information of the terminal device 10 (S1016). Furthermore, the multifunction peripheral 20 executes a process of a reconnection with the terminal device 10 (S1018). As the reconnection process, the multifunction peripheral 20 confirms normal communication with the terminal device 10, transmits information indicating operation information and job information required to be transmitted next to the terminal device 10, and transmits information on an operation screen for inputting a next operation to the terminal device 10. The terminal device 10 and the multifunction peripheral 20 are connected to each other by the reconnection process and the session is resumed, so that the communication between the terminal device 10 and the multifunction peripheral 20 is resumed.

Subsequently, the terminal device 10 and the multifunction peripheral 20 perform (resume) communication of the transmission/reception information (Application Data) using the Connection IDs and the TLS key information (S1020) similarly to the process in step S1008. By this, in the terminal device 10, the remote operation becomes available again (S1022).

In this way, when the network connection on the terminal device 10 side is restored after the wireless connection or other connection on the terminal device 10 side is disconnected once, the terminal device 10 may perform the interrupted communication again. Accordingly, the terminal device 10 may resume the communication for transmitting the operation information and the job information which have not yet been transmitted to the multifunction peripheral 20.

When the terminal device 10 resumes the communication with the multifunction peripheral 20, the Connection IDs and the TLS key, information used in the QUIC protocol are used to resume the communication based on the QUIC protocol. Since the terminal device 10 is not required to perform a process of re-establishing a session with the multifunction peripheral 20 (a session reconnection process), such as handshake, the terminal device 10 can efficiently perform a reconnection with the multifunction peripheral 20.

Furthermore, although the communication from the terminal device 10 is interrupted during the communication, the multifunction peripheral 20 maintains a communication acceptable state by storing the Connection IDs and the TLS key information used in the QUIC protocol. Therefore, the multifunction peripheral 20 can resume the communication with the terminal device 10 using the Connection IDs and the TLS key information. Furthermore, since the QUIC protocol is used, the multifunction peripheral 20 is connected to the terminal device 10 when the communication from the terminal device 10 is resumed, and the session with the terminal device 10 is resumed without performing a special session resuming process. Accordingly, the multifunction peripheral 20 can efficiently perform the communication with the terminal device 10 from the continuation of the interrupted communication.

As described above, when the session between the terminal device 10 and the multifunction peripheral 20 is resumed, a process of resuming the session (a session process) is not required to be performed again between the terminal device 10 and the multifunction peripheral 20, and the transmission and the reception of the information (data processing) can be performed from the continuation of the interrupted communication.

1.3.2 Process of Terminal Device

Figure 7:
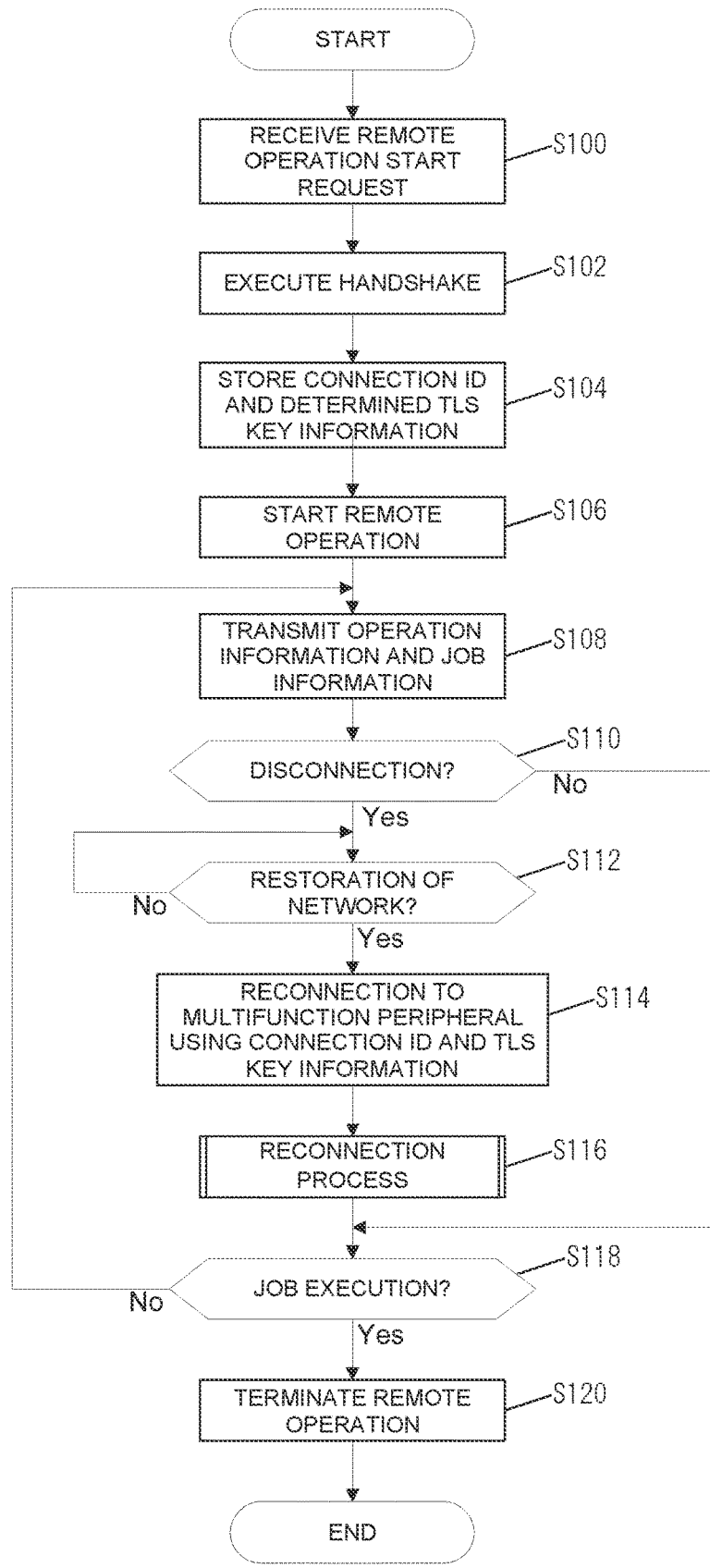
FIG. 7 is a flowchart of a flow of a process performed by terminal device according to the first embodiment.

Next, a process executed by the terminal device 10 will be described with reference to FIG. 7. A process illustrated in FIG. 7 is executed by the controller 100 which has read the operation application 162. Note that it is assumed that the multifunction peripheral information including the multifunction peripheral name and the address information of the multifunction peripheral 20 is stored in advance in the multifunction-peripheral information storage region 164.

First, the controller 100 receives a remote operation start request (step S100). For example, the controller 100 displays on the display 140 a screen listing names of multifunction peripherals included in the multifunction peripheral information stored in the multifunction-peripheral-information storage region 164 (a multifunction-peripheral selection screen). When one multifunction peripheral 20 is selected by the user and an operation is performed to start the connection, the controller 100 receives a request for starting a remote operation of the selected multifunction peripheral 20.

Subsequently, the controller 100 performs handshake with the multifunction peripheral 20 via the communicator 190 based on the QUIC protocol (step S102). For example, the controller 100 reads multifunction peripheral information corresponding to the multifunction peripheral 20 selected in step S100 from the multifunction-peripheral-information storage region 164. Furthermore, the controller 100 transmits a packet, for the handshake to an address included in the read multifunction peripheral information.

At this time, the controller 100 generates the terminal device Connection ID to be transmitted to the multifunction peripheral 20 and receives the multifunction peripheral Connection ID from the multifunction peripheral 20. In addition, the controller 100 generates a common key using the information transmitted and received when the handshake is performed. Moreover, when the generated common key and a common key generated by the multifunction peripheral 20 are identical, the controller 100 determines the common key as the TLS key information. For example, it can be determined that the generated common key and the common key generated by the multifunction peripheral 20 are identical when the controller 100 can receive encrypted information from the multifunction peripheral 20 and decrypt the information with the generated common key.

Then, the controller 100 stores the terminal device Connection ID, the multifunction peripheral Connection ID, and the TLS key information in multifunction peripheral information corresponding to the multifunction peripheral 20 selected in step S100 (step S104).

Subsequently, the controller 100 starts a remote operation (step S106). For example, the controller 100 displays a screen for a remote operation (an operation screen) on the display 140.

Thereafter, the controller 100 transmits operation information and job information through the communicator 190 (step S108). For example, the controller 100 encrypts the operation information indicating an operation input by the user using the TLS key information corresponding to the multifunction peripheral 20 of a connection destination. Furthermore, the controller 100 transmits a packet including the multifunction peripheral Connection ID corresponding to the multifunction peripheral 20 of the connection destination and the encrypted operation information to the multifunction peripheral 20.

Note that the controller 100 may encrypt the job information based on a user's operation using the TLS key information, and then transmit a packet including the multifunction peripheral Connection ID corresponding to the multifunction peripheral 20 of the connection destination and the encrypted operation information to the multifunction peripheral 20. Furthermore, the controller 100 may read a file selected by the user so that job information is generated as data (processing data) indicating content of the file.

Furthermore, when receiving information from the multifunction peripheral 20, the controller 100 decrypts the received information using the TLS key information determined in step S102. When receiving information on an operation screen from the multifunction peripheral 20, the controller 100 may display the operation screen on the display 140 based on the information.

Next, the controller 100 determines whether the connection to the multifunction peripheral 20 has been disconnected (step S110), For example, the controller 100 monitors the communicator 190 so as to detect whether the connection to the multifunction peripheral 20 has been disconnected. Note that when the connection to the multifunction peripheral 20 is disconnected, the controller 100 may display a message, on the display 140, indicating that the connection to the multifunction peripheral 20 has been disconnected.

When the connection to the multifunction peripheral 20 is disconnected, the controller 100 periodically determines whether the network has been restored (step S110; Yes→step S112). For example, the controller 100 determines that the network has been restored when a connection to the base station becomes available or when an IP address is determined. When the network is not restored, the controller 100 repeatedly performs the process in step S112 (step S112; No).

When the network has been restored, the controller 100 performs a reconnection to the multifunction peripheral 20 through the communicator 190 using the multifunction peripheral Connection ID and the TLS key information stored in step S104 (step S112; Yes→step S114). Therefore, the controller 100 transmits a reconnection request to the multifunction peripheral 20. The controller 100 may display a message, on the display 140, indicating that a remote connection to the multifunction peripheral 20 is being resumed.

Then, the controller 100 executes the reconnection process (step S116). For example, the controller 100 receives, from the multifunction peripheral 20, information indicating operation information or job information that is required to be transmitted next or information on an operation screen for inputting a next operation, and displays the operation screen on the display 140 based on the information. Furthermore, when the reconnection process is completed, the controller 100 may display, on the display 140, a message indicating that the communication with the multifunction peripheral 20 is resumed or the remote operation is resumed.

Note that, when receiving information indicating that the reconnection is rejected from the multifunction peripheral 20 in step S116, the controller 100 may display a message indicating that, the reconnection to the multifunction peripheral 20 has failed on the display 140 and return to step S100. Furthermore, when determining in step S110 that the connection to the multifunction peripheral 20 has not been disconnected, the controller 100 omits the process from step S112 to step S116 (step S110; No).

Subsequently, the controller 100 determines whether a job has been executed (step S118). For example, when receiving information indicating that execution of a job has been completed from the multifunction peripheral 20, the controller 100 determines that, the job has been executed.

Figure 8:
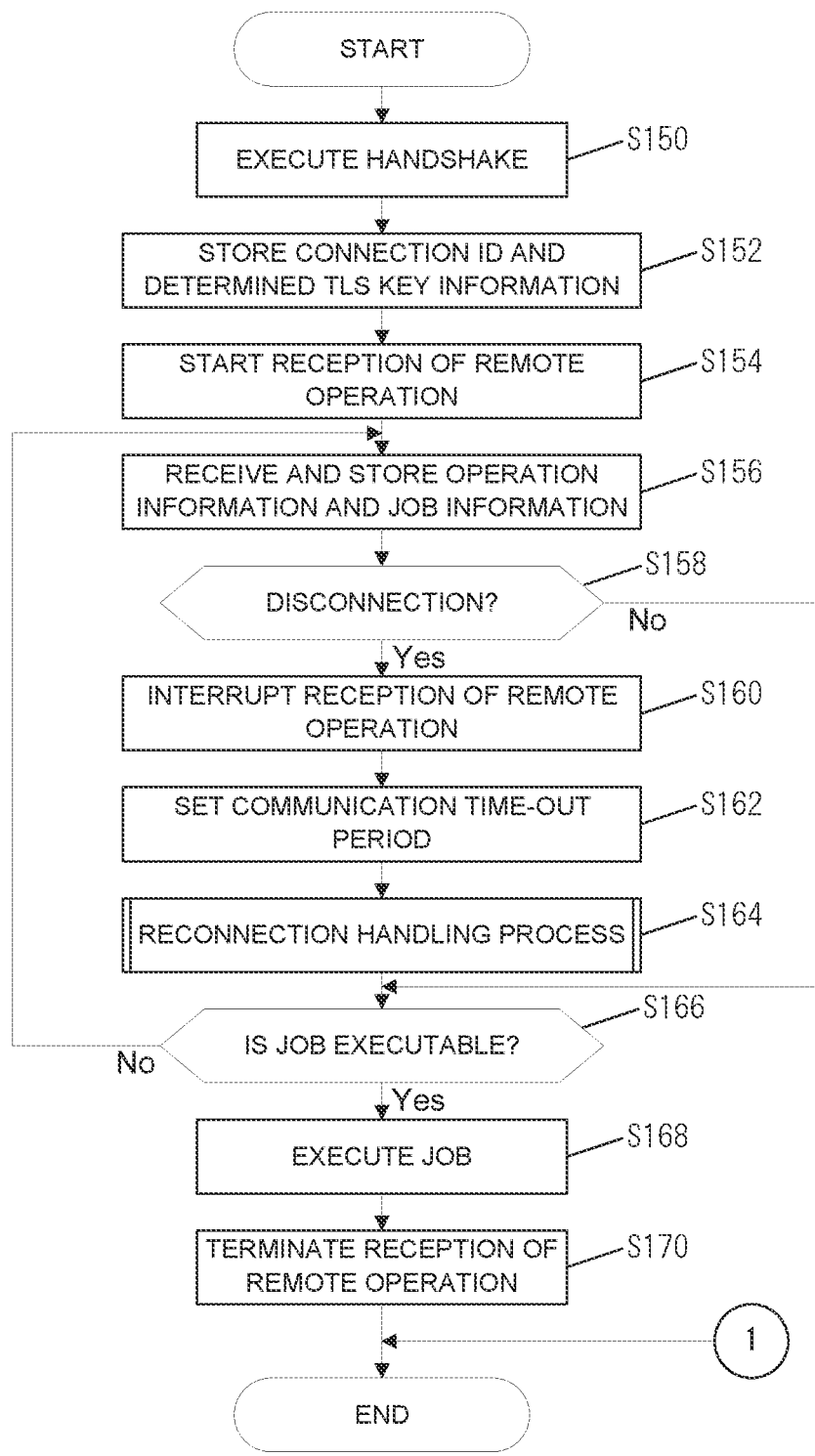
FIG. 8 is a flowchart of a flow of a process performed by multifunction peripheral according to the first embodiment.
Figure 9:
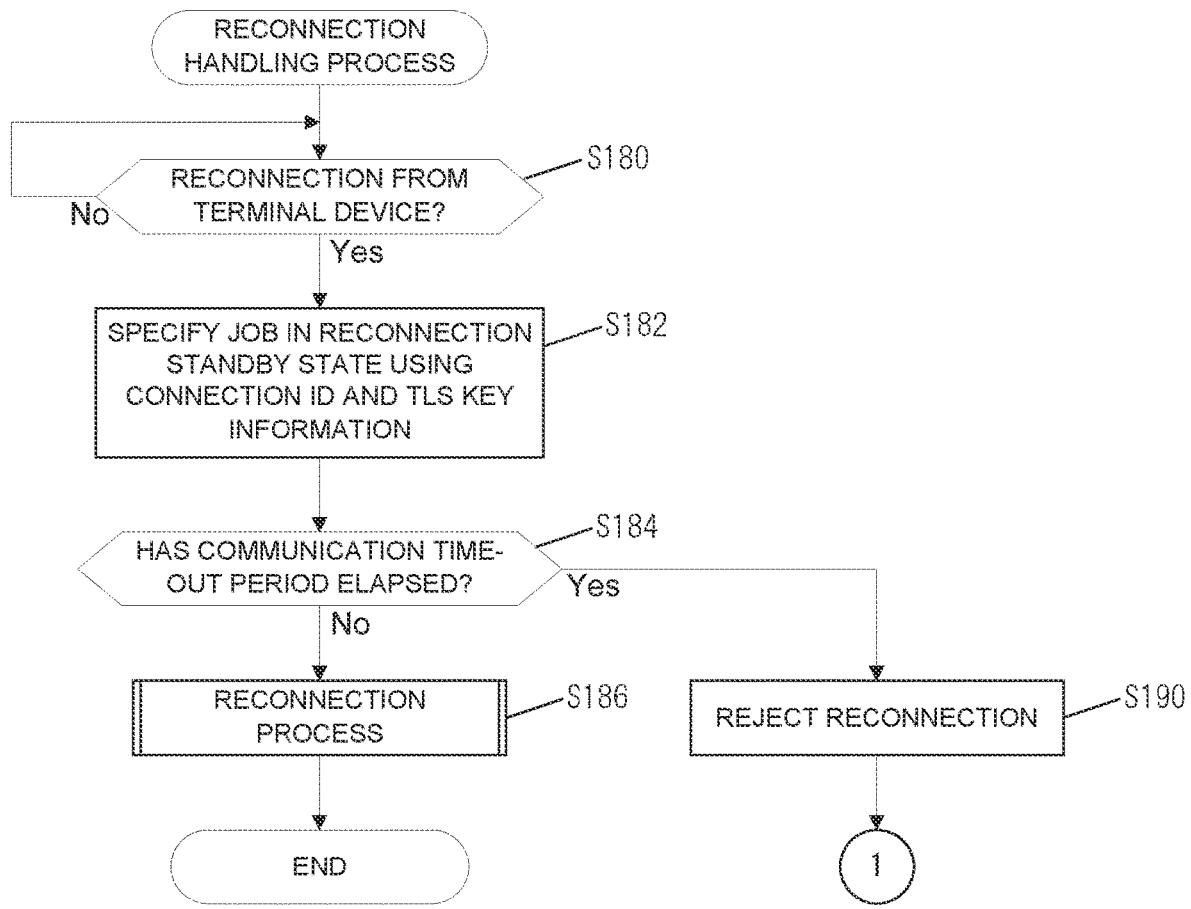
FIG. 9 is a flowchart of a flow of a reconnection handling process according to the first embodiment.

The controller 100 terminates the remote operation when the job has been executed (step S118; Yes→step S120). At this time, the controller 100 may display a message indicating that the job has been executed or a multifunction-peripheral selection screen on the display 140. When determining that the job has not been executed, the controller 100 returns to step S108 (step S118; No→step S108), 1.3.3 Process of Multifunction Peripheral Next, a process executed by the multifunction peripheral 20 will be described with reference to FIGS. 8 and 9. Processes illustrated with reference to FIGS. 8 and 9 are executed by the controller 200 that has read programs stored in the storage 260.

First, the process illustrated in FIG. 8 will be described. When receiving, via the communicator 290, information (a packet) for performing handshake from the terminal device 10, the controller 200 executes handshake with the terminal device 10 in accordance with the QUIC protocol (step S150). For example, the controller 200 receives terminal device Connection ID from the terminal device 10 and generates multifunction peripheral Connection ID to be transmitted to the terminal device 10. Furthermore, the controller 200 generates a common key using the information transmitted and received in the handshake and determines that the common key is TLS key information when the generated common key and a common key generated by the terminal device 10 are identical.

Note that, when the controller 200 executes the process in step S150 and the display 240 displays a screen for accepting operations performed by the operation unit 250, the controller 200 may also display a message indicating that a process of starting a remote operation is being executed.

Subsequently, the controller 200 stores the terminal device Connection ID, the multifunction peripheral Connection ID, and the determined TLS key information (step S152). For example, the controller 200 issues a job ID and stores job detailed information including the job ID, the terminal device Connection ID, the multifunction peripheral Connection ID, and the MS key information in the job-detailed-information storage region 264. Furthermore, the controller 200 stores an address and a port number of the terminal device 10 that is involved in the handshake in the job detailed information, and sets a job status of the job detailed information to "Not Executed".

Subsequently the controller 200 starts accepting of a remote operation with the terminal device 10 (step S154). At this time, the controller 200 may stop the accepting of an input of an operation via the operation unit 250 and display a screen (lock screen) indicating that the remote operation is being performed on the display 240.

Thereafter, the controller 200 receives and stores operation information and job information from the terminal device 10 (step S156). For example, when receiving information from the terminal device 10, the controller 200 decrypts the received information using the TLS key information corresponding to the terminal device 10. At this time, when receiving the operation information or the job information from the terminal device 10, the controller 200 stores the operation information or the job information received from the terminal device 10 in the job detailed information corresponding to the terminal device 10.

When receiving processing data from the terminal device 10, the controller 200 may store the processing data in the processing-data storage region 262 and store a data name of the processing data in the job detailed information.

Furthermore, the controller 200 may transmit information (UT data) on an operation screen for inputting a next operation to the terminal device 10. For example, the controller 200 encrypts the information on the operation screen using the TLS key information corresponding to the terminal device 10 of a connection destination. Furthermore, the controller 200 transmits a packet including the terminal device Connection ID corresponding to the terminal device 10 of the connection destination and the encrypted information on the operation screen to the terminal device 10.

Subsequently, the controller 200 determines whether the connection to the terminal device 10 has been disconnected (step S158). For example, the controller 200 monitors the communicator 290 so as to detect whether the connection to the terminal device 10 has been disconnected.

When the connection to the terminal device 10 is disconnected, the controller 200 interrupts acceptance of a remote operation from the terminal device 10 (step S158; Yes→step S160).

Furthermore, the controller 200 sets a communication time-out period for the terminal device 10 whose connection has been disconnected (step S162). For example, the controller 200 may store in the storage 260 the communication time-out period associated with the job-information-detailed information storing the terminal device Connection ID of the terminal device 10 of the connection destination. Moreover, the communication time-out period may be set in advance or may be configured by an administrator of the multifunction peripheral 20.

In this case, the controller 200 may display a screen for accepting an operation through the operation unit 250 on the display 240 so as to display a message indicating that the remote operation has been interrupted.

Subsequently, the controller 200 executes a process for handling reconnection from the terminal device 10 (a reconnection handling process) (step S164). The reconnection handling process will be described below. Furthermore, the controller 200 resumes the connection to the terminal device 10 by executing the reconnection handling process.

Subsequently, the controller 200 determines whether a job based on the operation information and the job information stored in step S156 is executable (step S166). When determining that the job is not executable, the controller 200 returns to step S156 (step S166; No→step S156).

On the other hand, when the job is executable, the controller 200 executes the job based on the job information stored in step S156 (step S166; Yes→step S168). In this case, the controller 200 may update a job status of the job detailed information corresponding to the job to be executed to information indicated by "Executing" or "Executed" depending on progress of the job. Furthermore, when the job execution is completed, the controller 200 may transmit information indicating that the job execution is completed to the terminal device 10.

Subsequently, the controller 200 terminates the acceptance of the remote operation (step S170). For example, the controller 200 disconnects the connection to the terminal device 10 and displays a screen, on the display 240, for accepting operations using the operation unit 250.

Next, the reconnection handling process will be described with reference to FIG. 9. The controller 200 determines whether a reconnection is attempted by the terminal device 10 (step S180). When the reconnection is not attempted by the terminal device 10, the controller 200 repeatedly performs the process in step S180 (step S180; No).

When the reconnection is attempted by the terminal device 10, the controller 200 specifies a job in a reconnection standby state using the Connection ID received from the terminal device 10 and the TLS key information of the terminal device 10 (step S180; Yes→step S182). For example, the controller 200 reads, from the job-detailed-information storage region 264, job detailed information including the multifunction peripheral Connection ID identical to the multifunction peripheral Connection ID received from the terminal device 10. Furthermore, the controller 200 decrypts information received from the terminal device 10 using the TLS key information included in the read job detailed information. When the decryption is appropriately performed, it is determined that the job based on the operation information and the job information included in the job detailed information is the job in the reconnection standby state.

Thereafter, the controller 200 determines whether the communication time-out period set for the terminal device 10 that has performed the reconnection has elapsed (Step S184). When the communication time-out period has elapsed, the controller 200 rejects the reconnection attempted by the terminal device 10 and terminates the process illustrated in FIG. 8 (step S184; Yes→step S190). In this case, the controller 200 terminates the remote operation with the terminal device 10 without performing the reconnection to the terminal device 10 of the connection destination. Note that the controller 200 may transmit information indicating that the reconnection is rejected to the terminal device 10. When the communication time-out period has elapsed, the terminal device 10 can make a new connection by newly performing handshake with the multifunction peripheral 20 and perform a new remote operation.

On the other hand, when the communication time-out period has not elapsed, the controller 200 executes the reconnection process (Step S184; No→step S186). For example, the controller 200 checks whether a connection to the terminal device 10 is available. Furthermore, the controller 200 stores (updates) a new IP address and a new port number received from the terminal device 10 in step S180 in the job detailed information read in step S182. By this, even when the IP address or the port number of the terminal device 10 is changed, the controller 200 may use a changed IP address or a changed port number.

Furthermore, the controller 200 may transmit operation information or job information required to be transmitted next and transmit information on an operation screen for inputting a next operation to the terminal device 10 based on content (job information) of the job specified in step S182.

Furthermore, when the reconnection process is being performed, the controller 200 may display a message indicating that a request for a reconnection from the terminal device 10 is accepted on the display 240. Note that, when the reconnection process is completed and the remote operation from the terminal device 10 is resumed, the controller 200 may display a screen (a lock screen) indicating that the remote operation is being performed on the display 240.

1.4 Operation Example

Referring now to the drawings, screens displayed on the display 140 of the terminal device 10 and on the display 240 of the multifunction peripheral 20 when the processing in this embodiment is executed will be described.

Figure 10A:
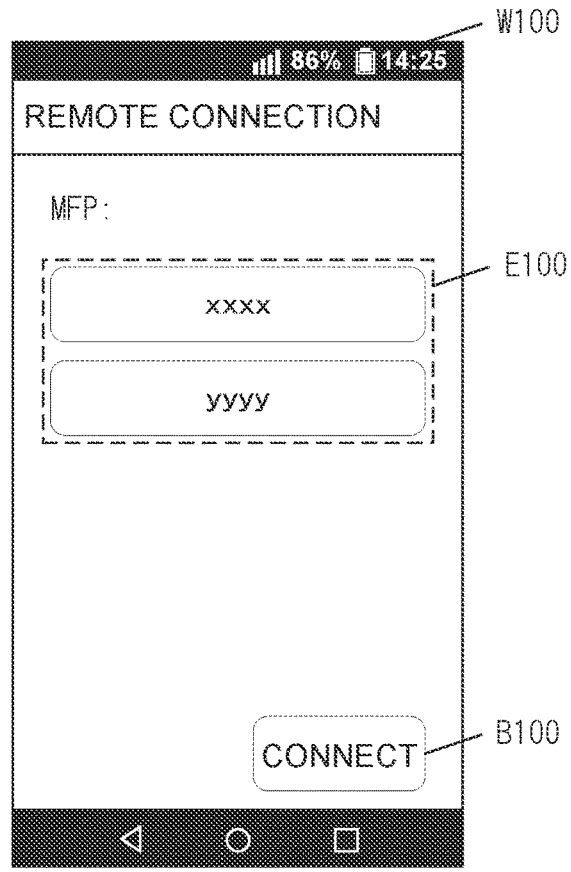
FIGS. 10A and 10B are diagrams illustrating an operation example according to the first embodiment.
Figure 10B:
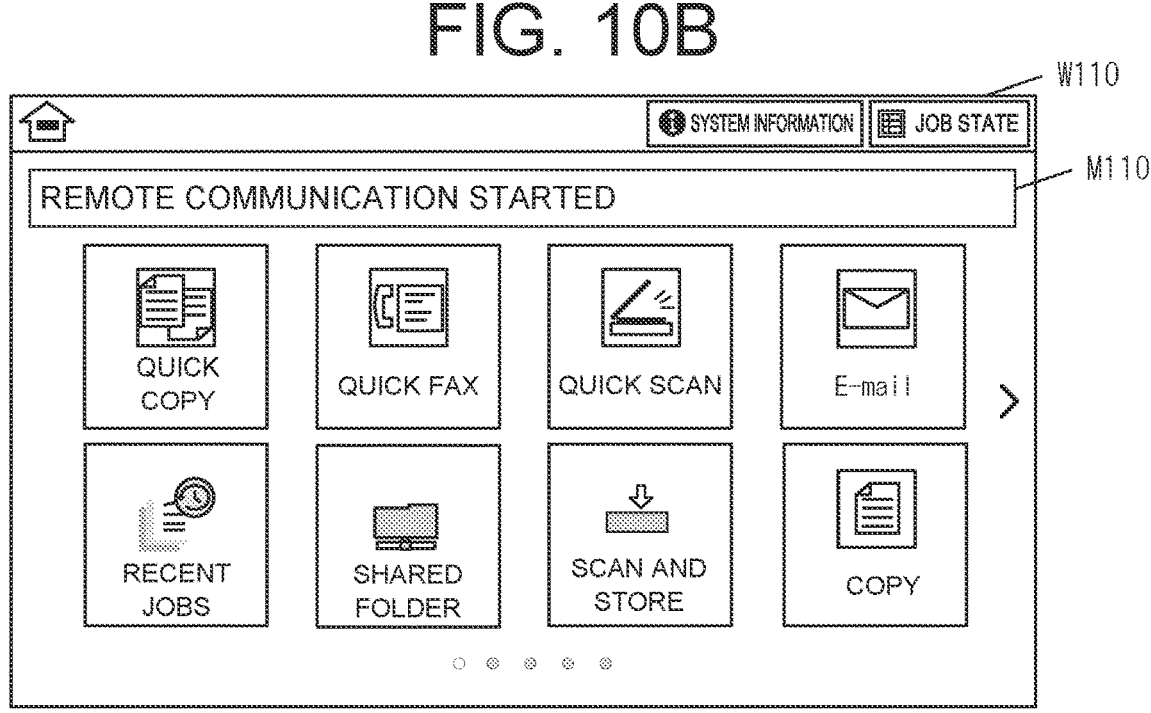

FIGS. 10A and 10B are diagrams illustrating screens displayed when communication for a remote operation (remote communication) is started. FIG. 10A is a diagram illustrating a multifunction-peripheral selection screen W100 displayed on the display 140. The multifunction-peripheral selection screen W100 includes a region E100 where names of multifunction peripherals included in the multifunction peripheral information stored in the terminal device 10 are displayed in a selectable manner. The user selects one multifunction peripheral 20 in the region E100 and then selects a connection button B100 so as to cause the terminal device 10 to start a connection to the selected multifunction peripheral 20.

FIG. 10B is a diagram illustrating a display screen W110 displayed on the display 240. The display screen W110 is displayed, for example, when handshake is performed. The display screen W110 displays a message M110 indicating that the communication for the remote operation is started.

Figure 11A:
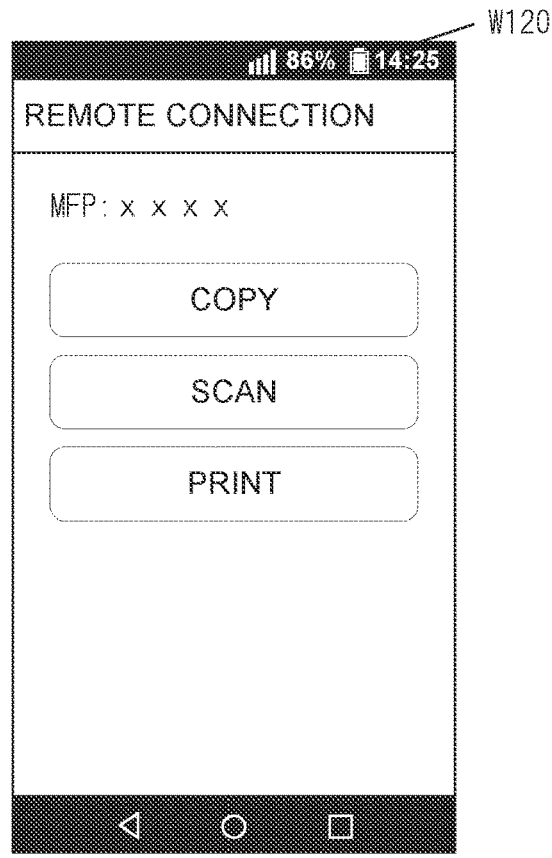
FIGS. 11A and 11B are diagrams illustrating an operation example according to the first embodiment.
Figure 11B:
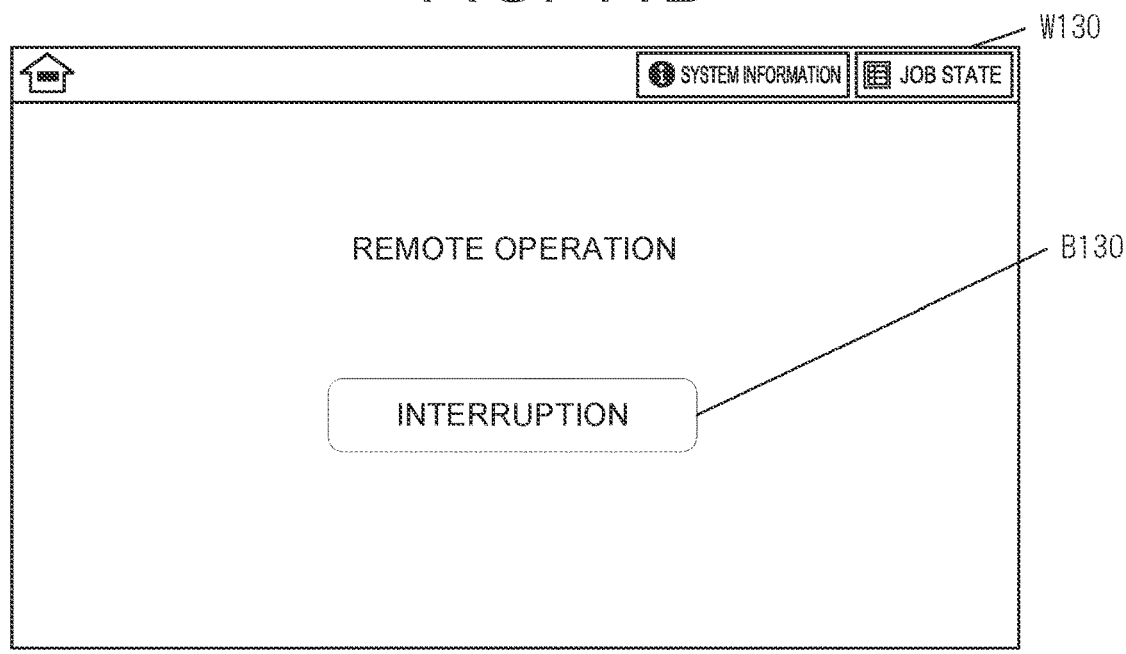

FIGS. 11A and 11B are diagrams illustrating screens displayed when the remote operation is being performed. FIG. 11A is a diagram illustrating a screen example of an operation screen W120 displayed on the display 140. The operation screen W120 displays buttons and other items for setting a job to be executed by the multifunction peripheral 20. For example, as illustrated in FIG. 11A, buttons are displayed to select a job to be executed by the multifunction peripheral 20. Note that the operation screen W120 may display buttons and lists for configuring job settings (e.g., the number of copies, a color mode, a paper size, a destination to transmit processing data, etc.) and for selecting files (processing data) to be transmitted to the multifunction peripheral 20. Operation information corresponding to an operation input by the user through the operation screen W120 and job information based on the user's operation are transmitted to the multifunction peripheral 20.

FIG. 11B is a diagram illustrating a screen example of a lock screen W130 displayed on the display 240. By displaying the lock screen, the user can recognize a state in which operations through the operation unit 250 are not accepted. The lock screen W130 may include an interruption button B130 for performing an operation through the operation unit 250 when the remote operation is being performed. When interruption button B130 is selected, the multifunction peripheral 20 may interrupt the remote operation and the operation via the operation unit 250 may be inputted.

Figure 12A:
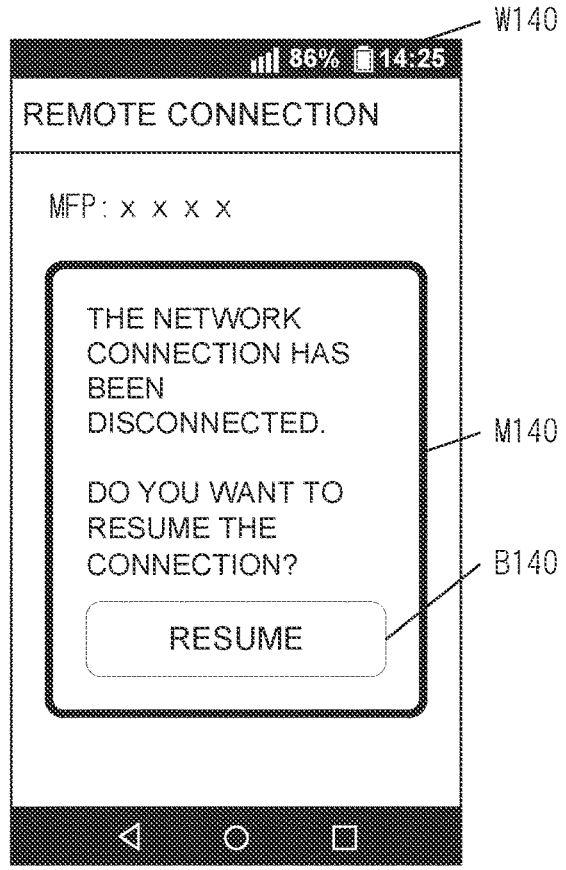
FIGS. 12A and 12B are diagrams illustrating an operation example according to the first embodiment.
Figure 12B:
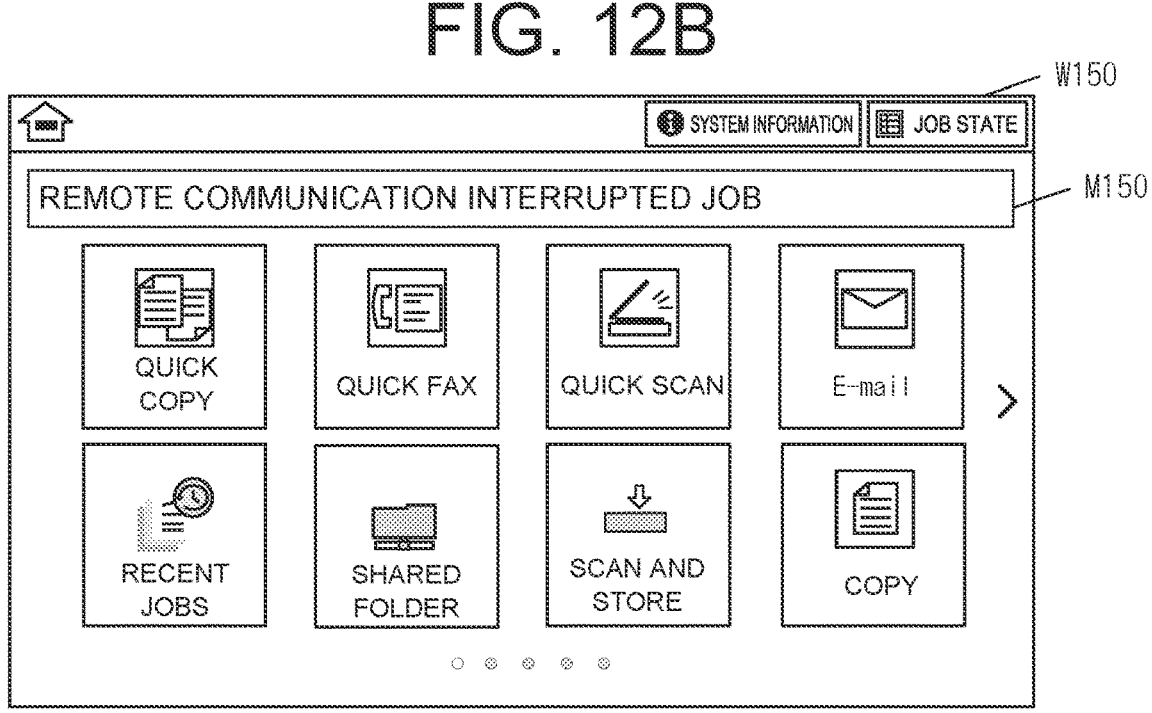

FIGS. 12A and 12B are diagrams illustrating screens displayed when the connection between the terminal device 10 and the multifunction peripheral 20 is disconnected and therefore the communication (the remote communication) is interrupted. FIG. 12A is a diagram illustrating a display example of a display screen W140 displayed on the display 140. The display screen W140 includes a message M140 indicating that the connection to the multifunction peripheral 20 has been disconnected. The user can recognize the disconnection from the multifunction peripheral 20 by checking the message M140. Furthermore, when selecting a resume button B140, the user can instruct the terminal device 10 to resume the communication with the multifunction peripheral 20.

FIG. 12B is a diagram illustrating a display example of a display screen W150 displayed on the display 240. The display screen W150 includes a message M150 indicating that the execution of the job based on the remote operation is interrupted due to the interruption of the remote communication. When checking the message M150, the user can recognize that the remote operation is interrupted and that the remote operation may be resumed.

Figure 13A:
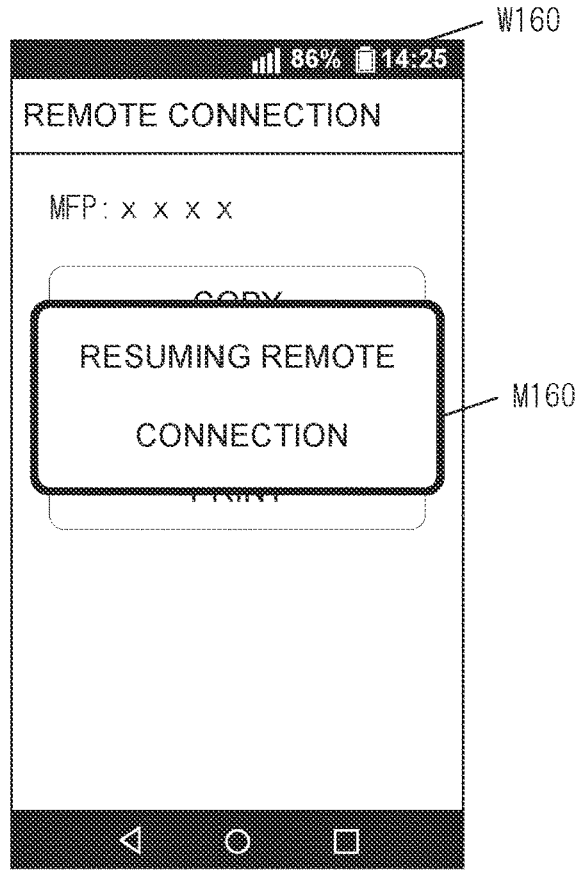
FIGS. 13A and 13B are diagrams illustrating an operation example according to the first embodiment.
Figure 13B:
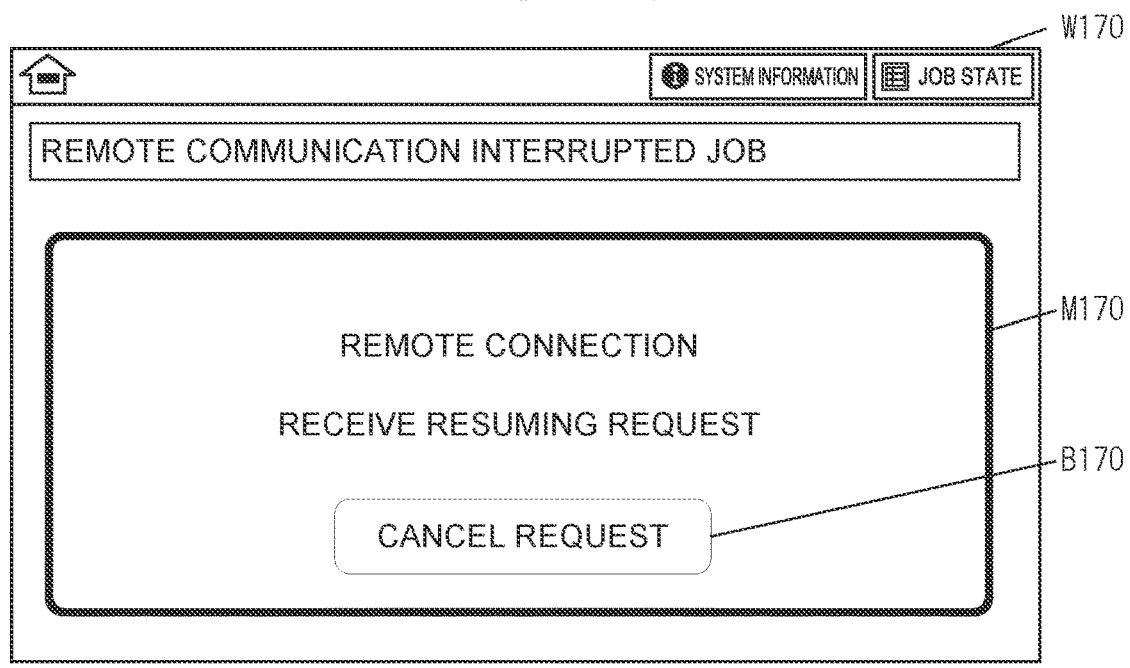

FIGS. 13A and 13B are diagrams illustrating screens displayed when the remote communication is being resumed. FIG. 13A is a diagram illustrating a display example of a display screen W160 displayed on the display 140. The display screen W160 shows a message M160 indicating that the connection between the terminal device 10 and the multifunction peripheral 20 is being resumed.

FIG. 13B is a diagram illustrating a display example of a display screen W170 displayed on the display 240, The display screen W170 shows a message M170 indicating that the connection between the terminal device 10 and the multifunction peripheral 20 is being resumed. Note that the message M170 may include a cancel button B170 for canceling the resumption of the connection between the terminal device 10 and the multifunction peripheral 20. When the cancel button B170 is selected, the resumption of the connection between the terminal device 10 and the multifunction peripheral 20 may be canceled and an operation via the operation unit 250 may be input.

Figure 14A:
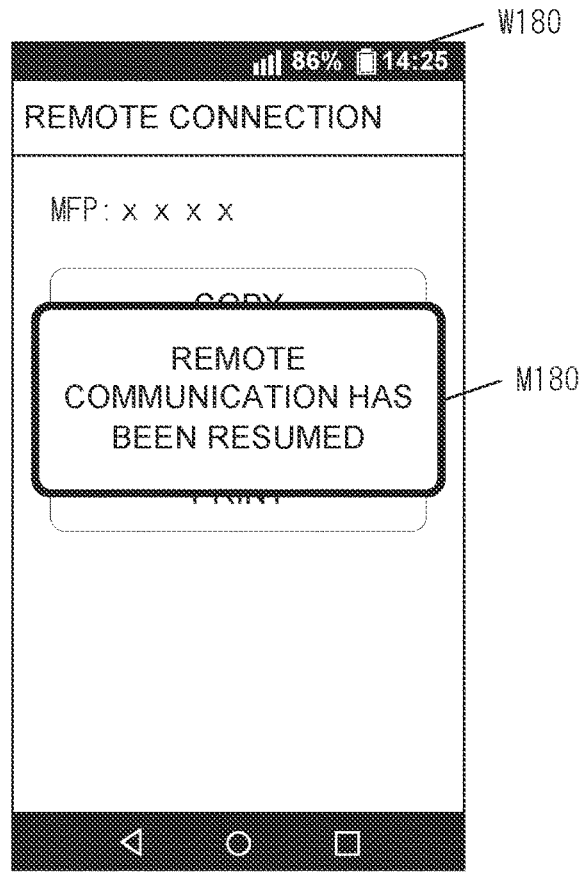
FIGS. 14A and 14B are diagrams illustrating an operation example according to the first embodiment.
Figure 14B:
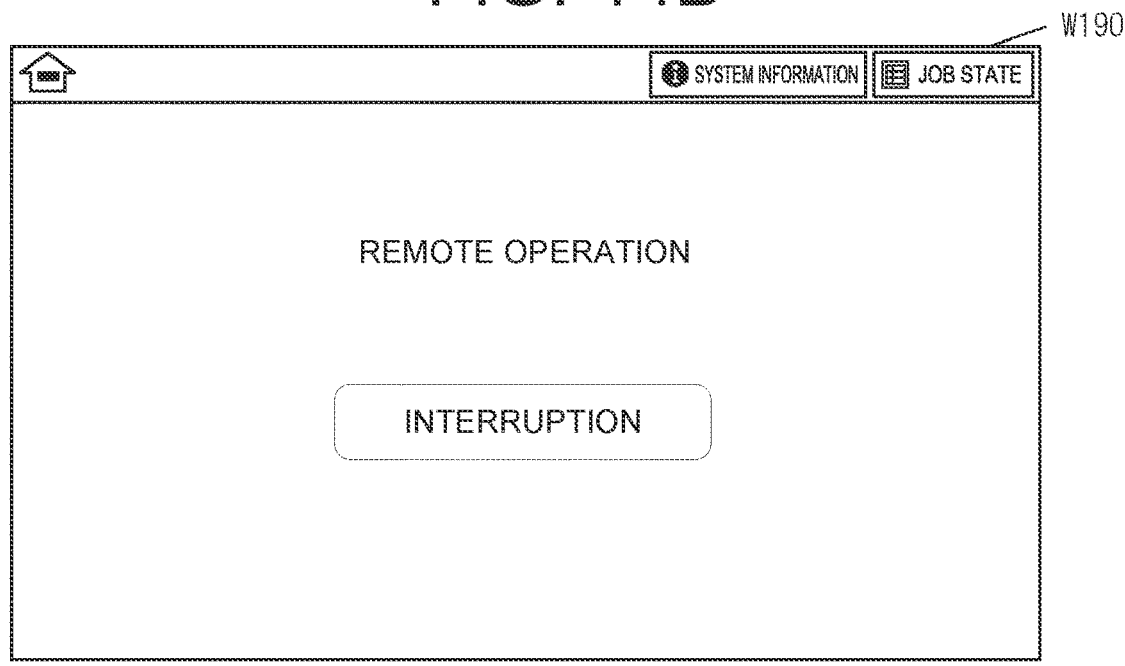

FIGS. 14A and 14B are diagrams illustrating screens displayed when the remote communication has been resumed. FIG. 14A is a diagram illustrating a display example of a display screen W180 displayed on the display 140. The display screen W180 displays a message M180 indicating that the communication between the terminal device 10 and the multifunction peripheral 20 has been resumed. FIG. 14B is a diagram illustrating a screen example of a lock screen W190 displayed on the display 240. The lock screen W190 is the same screen as the lock screen W130 in FIG. 11B.

As described above, the terminal device and the multifunction peripheral according to this embodiment may resume a session using the Connection IDs and the TLS key information used in the QUIC protocol and resume the communication. In particular, the multifunction peripheral of this embodiment is not required to transmit, receive, or store mobile unique information since the communication with the terminal device is resumed without using the mobile unique information, such as a telephone number. Therefore, even when the communications are intercepted or a storage of the multifunction peripheral is illicitly read, the mobile unique information is not leaked. Furthermore, since the multifunction peripheral of this embodiment does not associate the mobile phone information with the job information, leakage of the job information through impersonation can be avoided.

In addition, the terminal device and the multifunction peripheral according to this embodiment transmit and receive encrypted information. Therefore, the risk of leakage of the processing data, such as print data, and information that is transmitted/received (the operation information and the job information) may be reduced. Thus, according to this embodiment, since the mobile unique information is not used but a communication standard with high security is used, the security regarding the resumption of the communication can be improved and the risk of information leakage can be reduced. Consequently, the terminal device and the multifunction peripheral of this embodiment are capable of securely resuming the communication.

Furthermore, the terminal device and the multifunction peripheral in this embodiment perform communication using a communication protocol that can flexibly cope with a network disconnection and a change in an address and store communication information, such as the Connection IDs and the TLS key information. Accordingly, even when network failure or a change in an IP address occurs in the terminal device, the terminal device and the multifunction peripheral in this embodiment are capable of continuing an operation performed by the user. In particular, when a connection to the terminal device is disconnected, the multifunction peripheral of this embodiment performs a reconnection to the terminal device using the Connection IDs identifying the connection and the key information corresponding to the terminal device. In the reconnection performed after the disconnection, the terminal device and the multifunction peripheral of this embodiment are not required to perform special processes to resume a session, and therefore, the reconnection and the resumption of the communication may be efficiently executed.

2. Second Embodiment

Figure 15:
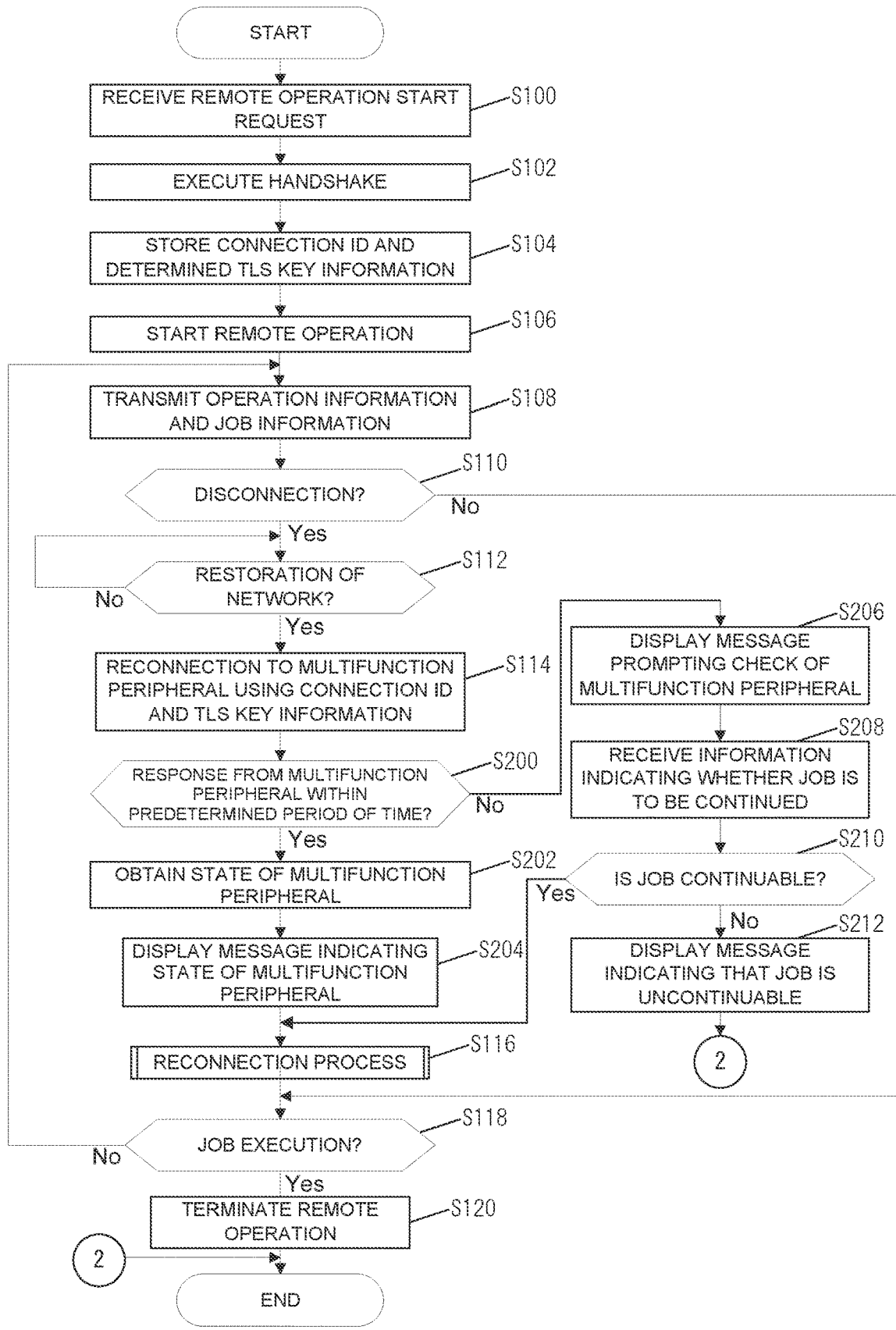
FIG. 15 is a flowchart of a flow of a process performed by a terminal device according to a second embodiment.

A second embodiment will now be described. In the second embodiment, in addition to the process described in the first embodiment, when communication between a terminal device and a multifunction peripheral is resumed, an operation of the terminal device is switched in accordance with a state of the multifunction peripheral. In this embodiment, FIG. 7 of the first embodiment is replaced with FIG. 15 and FIG. 9 is replaced with FIG. 16. Note that the same process is indicated by the same symbol and description thereof is omitted.

When a failure occurs in a network on a terminal device 10 side, it is assumed that an interruption time of communication between a terminal device 10 and a multifunction peripheral 20 may be long since a long period of time is required for restoration of the network. A state of the multifunction peripheral 20 may be changed during interruption of communication clue to a long interruption time. Therefore, when communication with the multifunction peripheral 20 is resumed, the terminal device 10 of this embodiment performs an operation in accordance with a state of the multifunction peripheral 20.

2.1 Outline of Operation of Terminal Device

In this embodiment, when communication between the terminal device 10 and the multifunction peripheral 20 is interrupted and a state of the multifunction peripheral 20 enters any of the following states (1) to (6) below, the terminal device 10 switches its operation according to the state of the multifunction peripheral 20.

(1) Case Where Operation State of Multifunction Peripheral 20 Enters Energy-Saving State
The energy-saving state is one of operation states of the multifunction peripheral 20, in which power supply is more limited than in a normal operation state. The multifunction peripheral 20 can individually set a time for shifting the operation state to the energy-saving state (an energy-saving setting time) as a setting for a remote operation. When communication with the terminal device 10 is disconnected during a remote operation and the communication with the terminal device 10 is not resumed after the energy-saving setting time has elapsed, the multifunction peripheral 20 enters the energy-saving state. The multifunction peripheral 20 may determine whether to retain job detailed information, operation information, and job information in settings.

Furthermore, the multifunction peripheral 20 is restored from the energy-saving state to a normal state (restoration from energy-saving) when the communication from the terminal device 10 is resumed. Note that the normal state is an operation state in which power is supplied to the individual functional sections of the multifunction peripheral 20.

When receiving a notification indicating that the restoration from energy-saving is being performed from the multifunction peripheral 20, the terminal device 10 may display a message indicating that the multifunction peripheral 20 is performing the restoration from energy-saving on the display 140. Furthermore, the terminal device 10 may display, on the display 140, a message indicating that a long period of time is required for performing update to display an operation screen for inputting a next operation from the terminal device 10, since a long period of time is required for the restoration from energy-saving. Note that the storage 160 may store UI data for operating the multifunction peripheral 20 in advance so that the terminal device 10 displays an operation screen based on the UI data before accepting a next operation, (2) Case where Multifunction Peripheral 20 is Turned Off
The multifunction peripheral 20 may be turned off directly by the user when communication with the terminal device 10 is disconnected. In this case, the terminal device 10 may not resume the communication with the multifunction peripheral 20, and therefore, the terminal device 10 displays a message for prompting the user to check a state of the multifunction peripheral 20. Furthermore, the terminal device 10 may prepare in advance a resume screen for resuming operation when the multifunction peripheral 20 is turned on (e.g., an operation screen for inputting a next operation) in the storage. 160 and display the resume screen.

When a print/transmission job may not continue after the multifunction peripheral 20 is turned on, the terminal device 10 may display a message indicating that the job may not be continued on the display 140.

(3) Case where Communication Time-Out Occurs in Transmission Destination
The multifunction peripheral 20 is designed to receive job information for each page from the terminal device 10 and successively execute the job information instead of a reception of entire job information from the terminal device 10, when transmitting image data or the like to a transmission destination specified by the user by a ScanToEmail function or the like.

When communication with the terminal device 10 is disconnected during the execution of a job based on page-by-page job information by the multifunction peripheral 20, time-out may occur in communication with a transmission destination. In this case, the multifunction peripheral 20 stores information on a fact that time-out has occurred in association with job detailed information of the terminal device 10 whose communication is interrupted. When time-out occurs in the communication with the transmission destination, the terminal device 10 displays, on the display 140, a message indicating that time-out has occurred in the transmission destination of the job information.

(4) Case Where Job is Canceled by Multifunction Peripheral 20
When an interrupted operation or an interrupted job may be canceled during interruption of the communication with the terminal device 10, the multifunction peripheral 20 may cancel a job associated with a remote operation with the terminal device 10. In this case, the terminal device 10 displays a message indicating that the job has been canceled on the display 140.

(5) Case where Trouble Occurs in Multifunction Peripheral 20

While the communication with the terminal device 10 is disconnected, a trouble may occur in the multifunction peripheral 20. In this case, the terminal device 10 displays a message indicating that a trouble has occurred in the multifunction peripheral 20 on the display 140.

(6) Case where Setting of Multifunction Peripheral 20 is Changed

While the communication with the terminal device 10 is disconnected, a setting or a state of the multifunction peripheral 20 may be changed. For example, a size and a direction of paper in a paper tray or content of an address book (information on transmission destinations of image data) may be changed in the multifunction peripheral 20.

When the communication with the terminal device 10 is resumed, the multifunction peripheral 20 transmits information indicating that the setting of the multifunction peripheral 20 has been changed to the terminal device 10. In this case, the terminal device 10 displays a message indicating that the setting of the multifunction peripheral 20 has been changed on the display 140. Furthermore, the terminal device 10 may confirm with the user whether to update a portion of the job information that has been changed from previous information (changed information).

2.2 Processing Flow 2.2.1 Terminal Device

A process executed by the terminal device 10 of this embodiment will be described with reference to FIG. 15. In this embodiment, after making a reconnection to the multifunction peripheral 20 (step S114), the controller 100 determines whether a response from the multifunction peripheral 20 has been detected within a certain period of time determined in advance (step S200). The certain period of time may be determined in advance or may be set by the user.

When detecting a response from the multifunction peripheral 20 within the certain period of time, the controller 100 obtains a state of the multifunction peripheral 20 (step S200; Yes→Step S202). For example, the controller 100 may obtain a state of the multifunction peripheral 20 by inquiring the state to the multifunction peripheral 20. The multifunction peripheral 20 may be configured to make a response including information indicating the state of the multifunction peripheral 20 when the reconnection is made by the terminal device 10 so that the controller 100 obtains the state of the multifunction peripheral 20 based on the response from the multifunction peripheral 20.

The following states are obtained as states of the multifunction peripheral 20 as described in the outline of the processing.

Restoration from energy-saving is being performed.
Communication time-out has occurred in the transmission destination.
A job is canceled.
A trouble has occurred in the multifunction peripheral 20.
A setting has been changed in the multifunction peripheral 20.

The controller 100 displays a message indicating a state of the multifunction peripheral 20 in accordance with the state of the multifunction peripheral 20 (step S204). When the multifunction peripheral 20 is in a state in which the restoration from energy-saving is being performed, for example, the controller 100 displays a message indicating that the multifunction peripheral 20 is performing the restoration from energy-saving on the display 140. Note that, at this time, the controller 100 may display an operation screen for inputting a next operation when the multifunction peripheral 20 is in the state in which the restoration from energy-saving is being performed. When a setting of the multifunction peripheral 20 has been changed as a state of the multifunction peripheral 20, the controller 100 may make an inquiry to the user, to ask whether a portion that has changed from past information is to be updated.

The controller 100 executes the reconnection process after a message indicating the state of the multifunction peripheral 20 is displayed (step S116). Note that when the state of the multifunction peripheral 20 is not changed, the controller 100 may omit the process in step S204 and execute the reconnection process.

On the other hand, when receiving no response from the multifunction peripheral 20 within the certain period of time, the controller 100 displays, on the display 140, a message prompting the user to check the multifunction peripheral 20 (step S200; No→step S206). In this case, the controller 100 may display a resume screen on the display 140.

Furthermore, the connection may be resumed when the multifunction peripheral 20 is turned on (when the power is on) by a periodical reconnection by the controller 100 to the multifunction peripheral 20. Here, the controller 100 receives information indicating whether to continue the job (step S208) when the connection to the multifunction peripheral 20 is resumed and determines whether the job is continuable (step S210).

When the job is not continuable, the controller 100 displays a message indicating that the job is not continuable on the display 140 (step S210; No→step S212) and terminates the process illustrated in FIG. 15. On the other hand, when the job is continuable, the controller 100 executes a process in step S116 (step S210; Yes→step S116).

2.2.2 Multifunction Peripheral

Reconnection Handling Process

Figure 16:
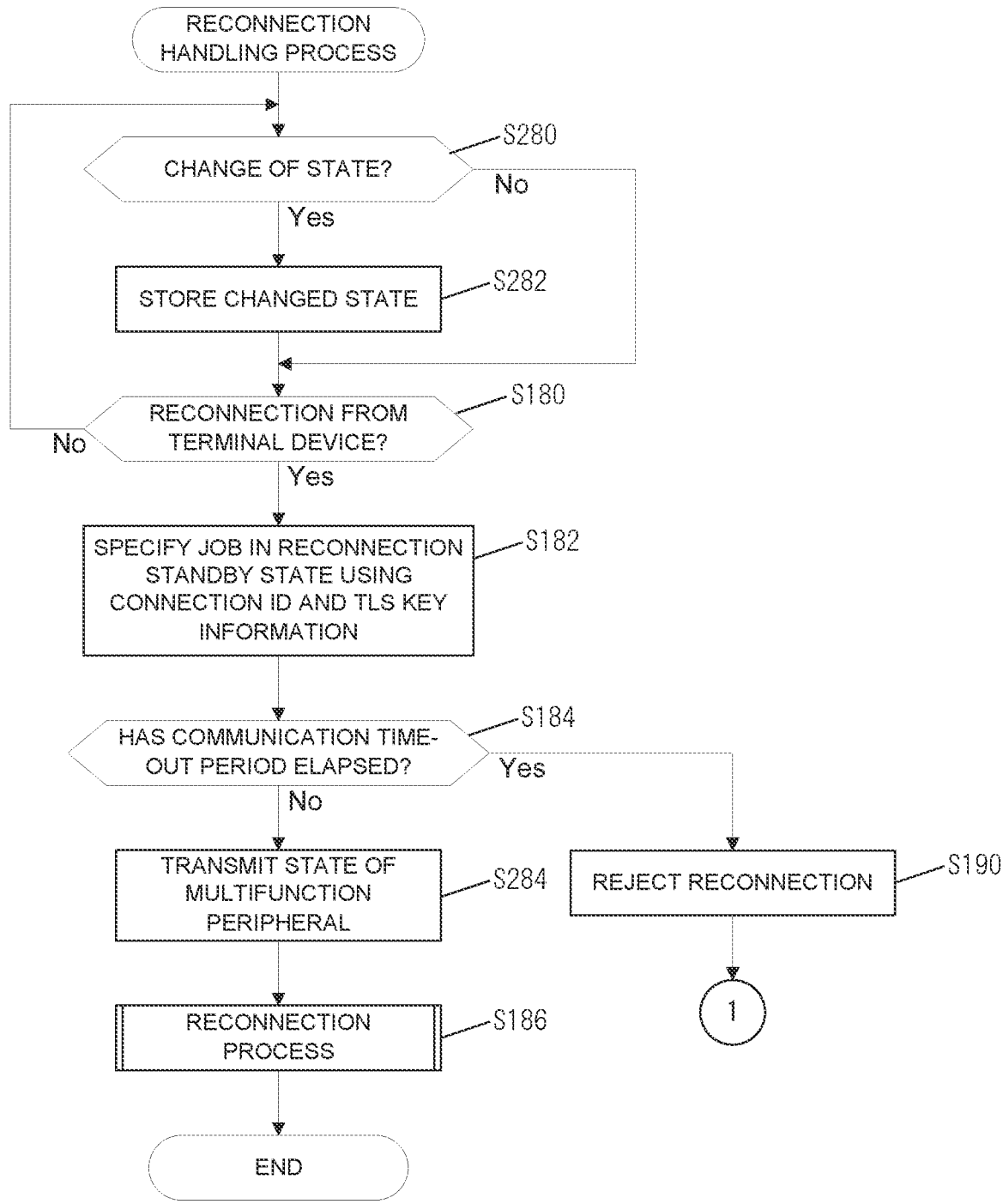
FIG. 16 is a flowchart of a flow of a reconnection handling process according to the second embodiment.

The reconnection handling process executed by the multifunction peripheral 20 of this embodiment will be described with reference to FIG. 16. The controller 200 determines whether a state of the multifunction peripheral 20 has been changed (step S280). Examples of the change in a state of the multifunction peripheral 20 include switching into an energy-saving mode, occurrence of time-out in a transmission destination of job information, cancel of a job, occurrence of a trouble, and a change in a setting.

When the state of the multifunction peripheral 20 has been changed, the controller 200 stores the state of multifunction peripheral 20 after the change in the state of the multifunction peripheral 20 being associated with information on the terminal device 10 whose communication has been interrupted (step S280; Yes→step S282). For example, the controller 200 may store the information indicating the state of the multifunction peripheral such that the information indicating the state of the multifunction peripheral 20 is included in job detailed information having a status of "not executed" among job detailed information or such that the information indicating the state of the multifunction peripheral 20 is associated with the job detailed information but separately from the job detailed information.

Note that, when the state of the multifunction peripheral 20 has not been changed, the controller 200 omit the process in step S282 (step S280; No).

Furthermore, before executing the reconnection process, the controller 200 transmits the information indicating the state of the multifunction peripheral 20 to the terminal device 10 which has transmitted information on a job in a reconnection standby state (step S284). The controller 200 may transmit the information indicating the state of the multifunction peripheral 20 in response to an inquiry from the terminal device 10 or transmit the information indicating the state of the multifunction peripheral 20 such that the information indicating the state of the multifunction peripheral 20 is included in a response to the reconnection from the terminal device 10.

Power-On Process

Figure 17:
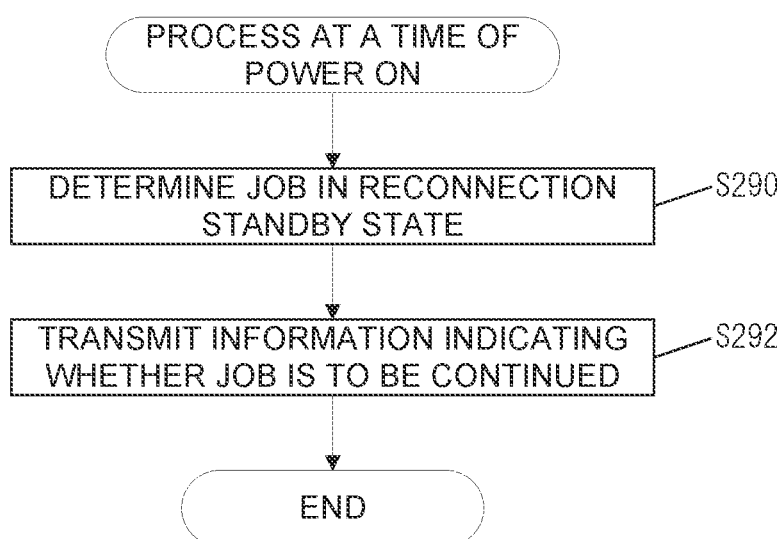
FIG. 17 is a flowchart of a flow of a process executed when a power is on according to the second embodiment.

When being powered, the controller 200 executes a power-on process illustrated in FIG. 17. First, the controller 200 specifies a job in a reconnection standby state. For example, the controller 200 specifies a job corresponding to operation information and job information included in job detailed information having a status of "Not Executed" as the job in the connection standby state.

Then, the controller 200 determines whether the job specified in step S290 is continuable and transmits information indicating whether the job is continuable to the terminal device 10 that has transmitted the job information corresponding to the job (step S292).

By executing the processes described above by the terminal device 10 and the multifunction peripheral 20, the terminal device 10 can obtain a state of the multifunction peripheral 20 after the communication with the multifunction peripheral 20 is resumed and switch a process in accordance with the state of the multifunction peripheral 20.

In this way, when performing a reconnection to the multifunction peripheral, the terminal device of this embodiment can display a message appropriate for the state of the multifunction peripheral and prompt the user to input a next operation. Accordingly, the terminal device of this embodiment can realize highly convenient remote operation for the user.

3. Third Embodiment

Figure 19:
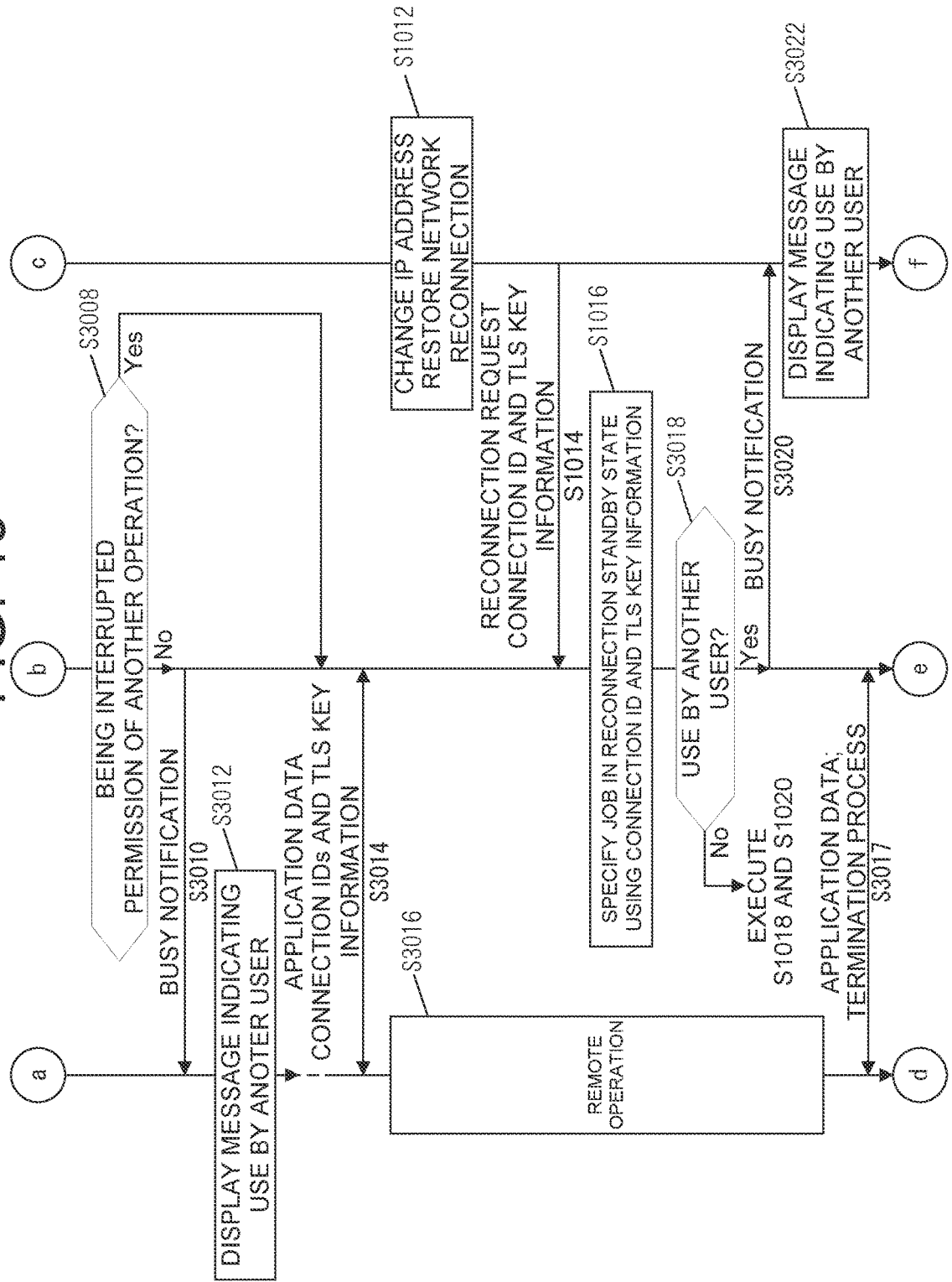
FIG. 19 is a sequence diagram illustrating the flow of the process according to the third embodiment.
Figure 20:
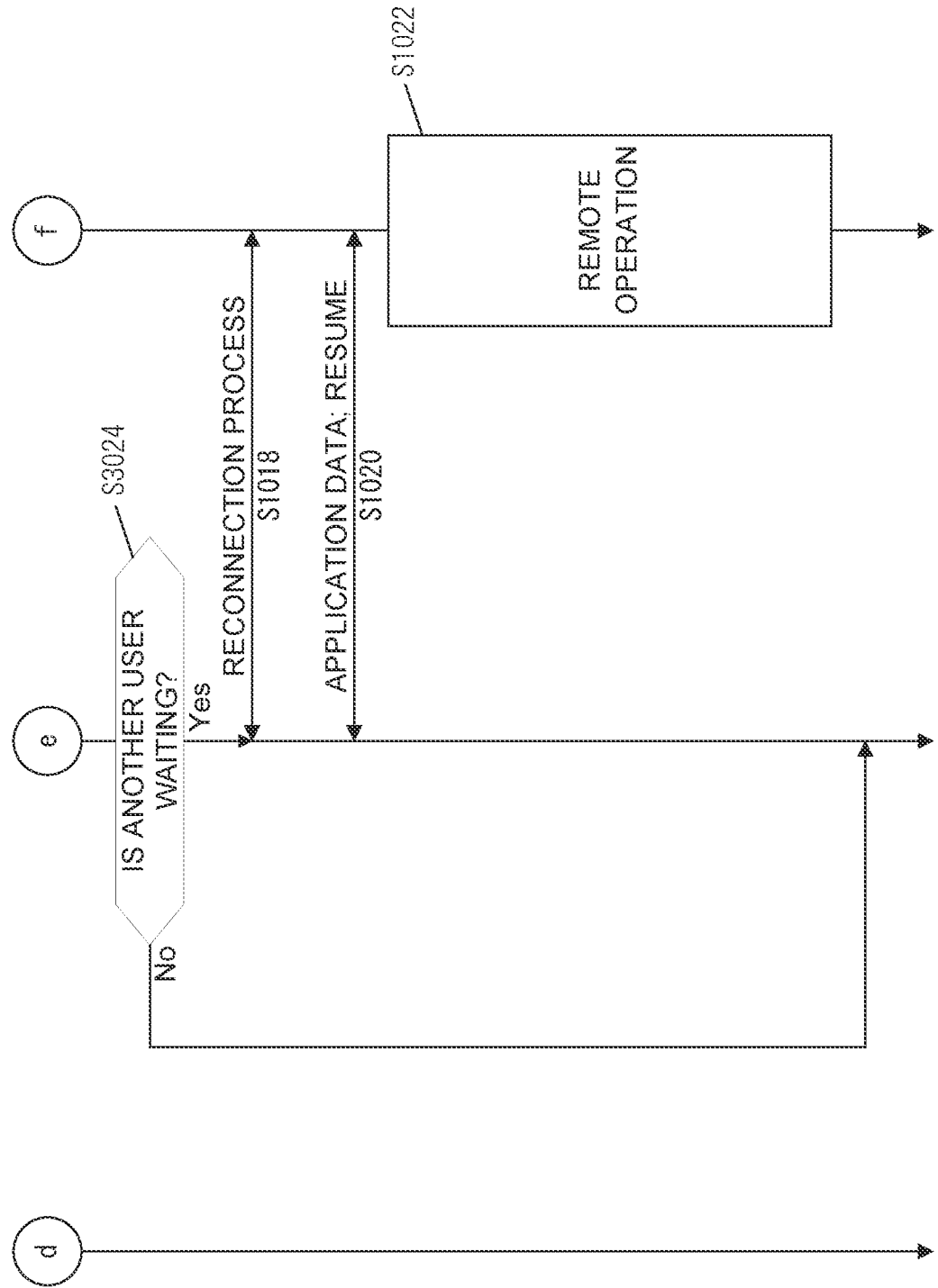
FIG. 20 is a sequence diagram illustrating the flow of the process according to the third embodiment.
Figure 21:
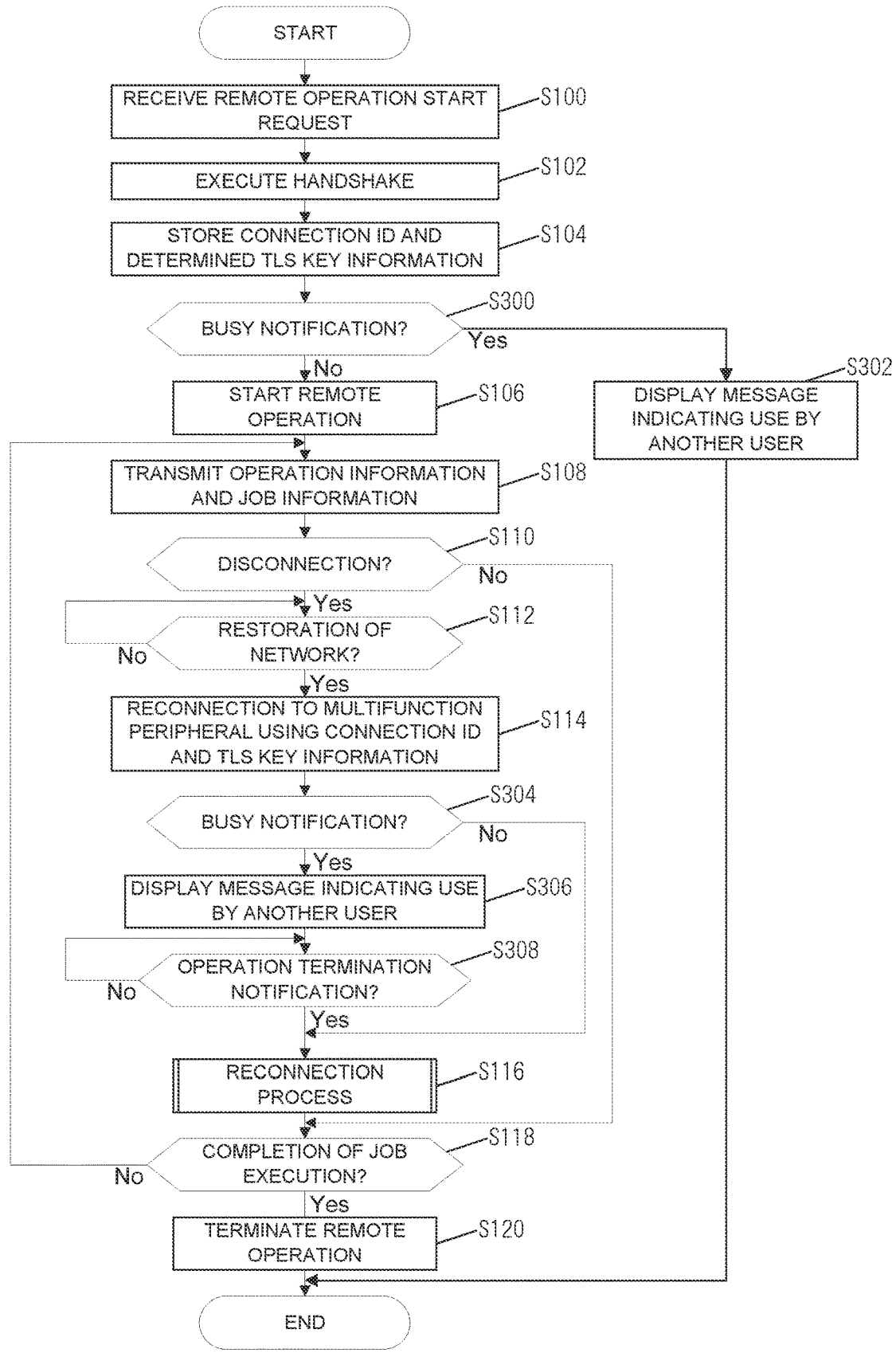
FIG. 21 is a flowchart of a flow of a process performed by a terminal device according to the third embodiment.
Figure 22:
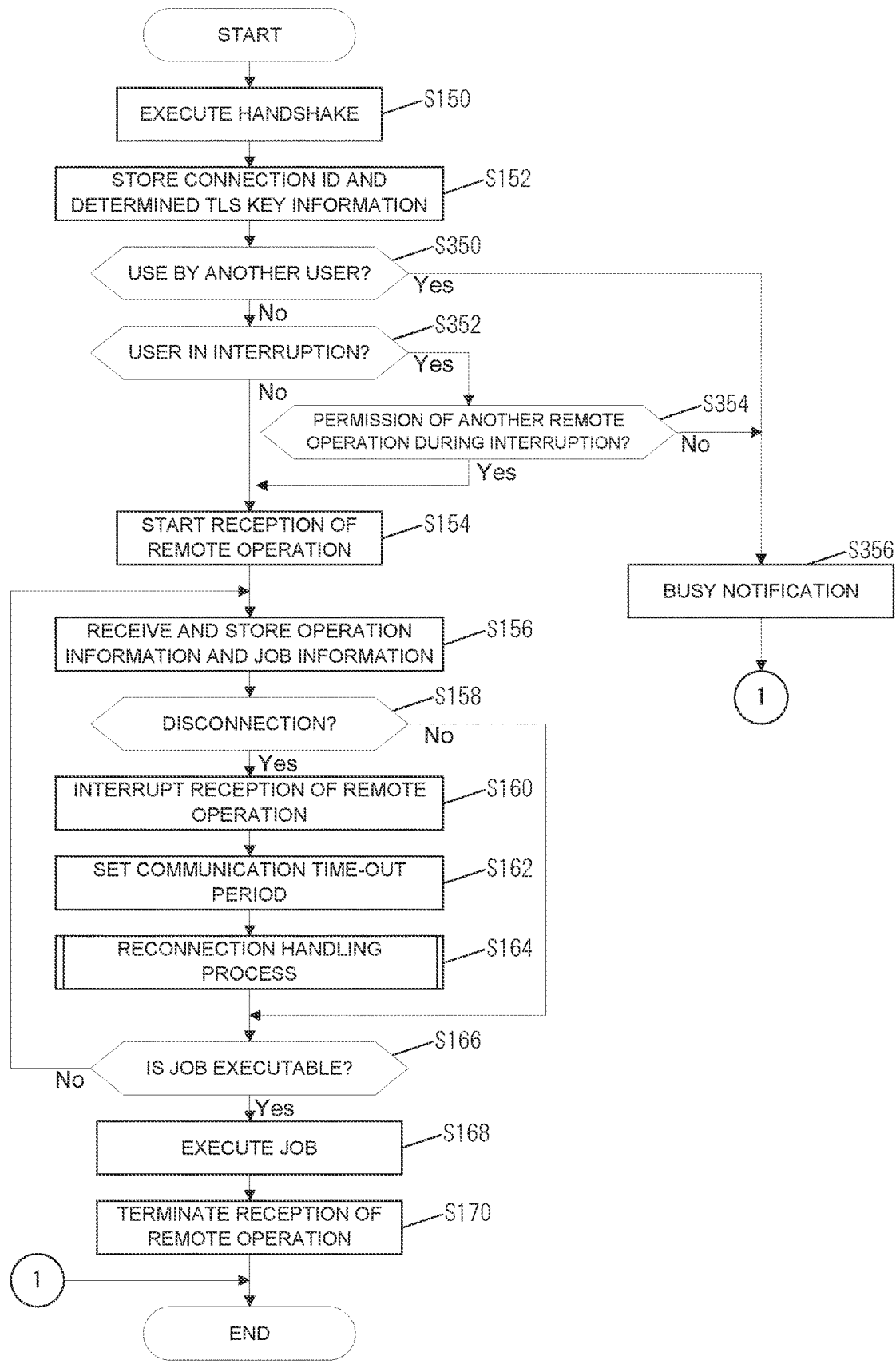
FIG. 22 is a flowchart of a flow of a process performed by a multifunction peripheral according to the third embodiment.

Next, a third embodiment will be described. The third embodiment corresponds to a case where, while a remote operation of a certain user is interrupted, a remote operation is requested by another user in addition to the process described in the first embodiment. In this embodiment, FIG. 6 is replaced with FIGS. 18 to 20, FIG. 7 is replaced with FIG. 21, FIG. 8 is replaced with FIG. 22, and FIG. 9 is replaced with FIG. 23. Note that the same process is indicated by the same symbol and description thereof is omitted.

While communication with a terminal device 10 is interrupted, a multifunction peripheral 20 may execute an operation or a job of another user when the other user (another terminal device 10) executes a remote operation. In this case, when the interrupted communication is resumed while the other user is performing the remote operation, the terminal device 10 that resumed the interrupted communication displays a message indicating that the other user is performing an operation.

Note that, when the interrupted communication is resumed while the user is performing the remote operation, the multifunction peripheral 20 may reserve the remote operation from the terminal device 10 that has resumed the communication. Furthermore, UI data for operating the multifunction peripheral 20 may be stored in the terminal device 10 in advance so that the terminal device 10 displays an operation screen based on the UI data to accept a next operation while the other user operates the multifunction peripheral 20. Furthermore, when the remote operation performed by the other user is terminated, the multifunction peripheral 20 may notify the terminal device 10, which has resumed the communication, of a state in which the remote operation is now available. The terminal device 10 resumes the remote operation when receiving the notification indicating that the remote operation is available from the multifunction peripheral 20.

Note that, while the communication with the terminal device 10 is interrupted, the multifunction peripheral 20 may perform a setting for determining whether a remote operation or job execution is permitted for the other user. When another operation or another job execution by another user is prohibited, the multifunction peripheral 20 may display a message indicating that another operation or another job execution is prohibited on a display 240 to other users.

A setting for determining whether to prohibit a remote operation or job execution of another user during interruption of the communication with the terminal device 10 is made by an administrator of the multifunction peripheral 20, for example, and is stored in a storage 260.

3.1 Outline of Processing

Figure 18:
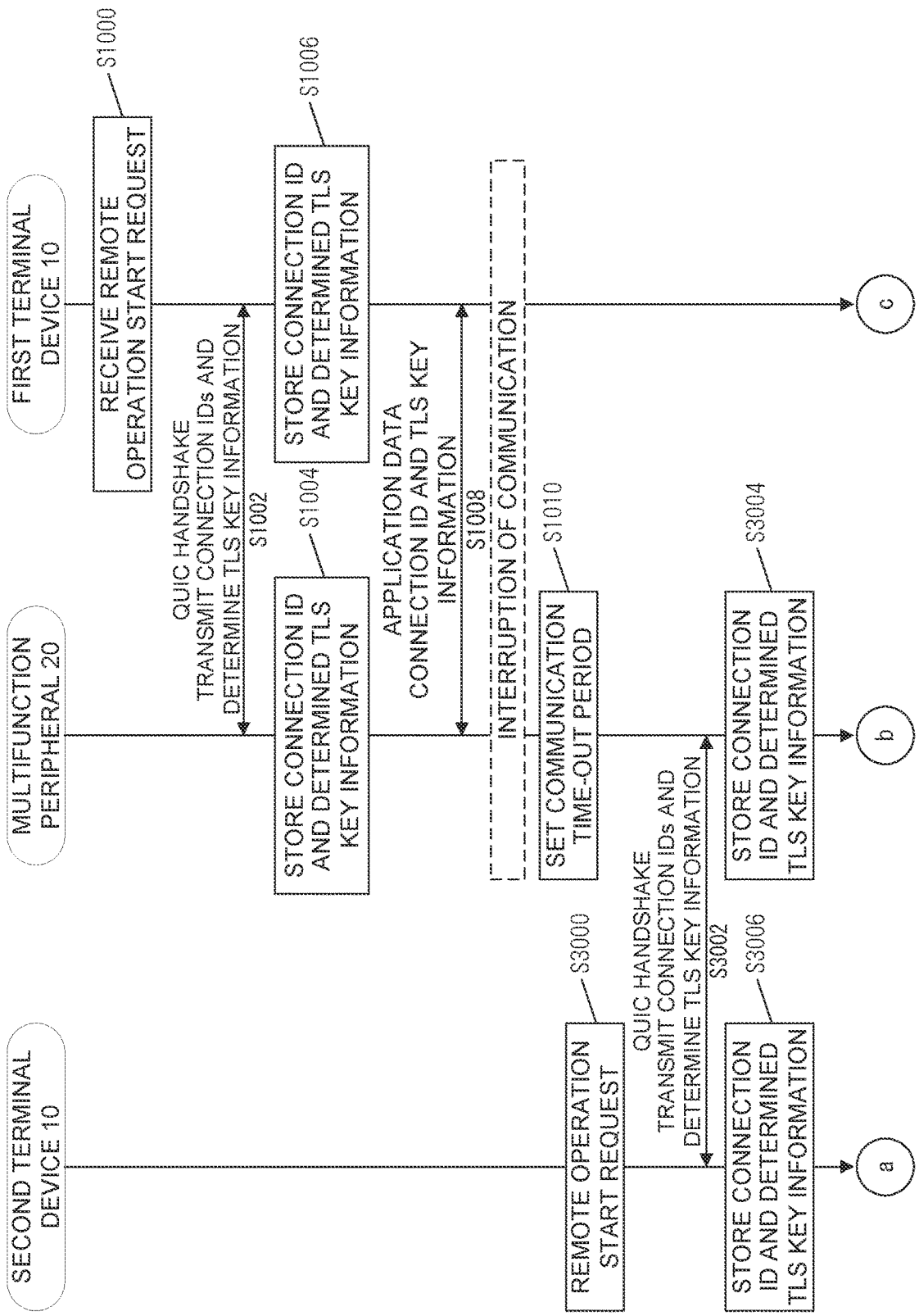
FIG. 18 is a sequence diagram illustrating a flow of a process according to a third embodiment.

Next, a process of this embodiment will be described with reference to FIGS. 18 to 20. It is assumed that the multifunction peripheral 20 is connectable to two terminal devices 10 (a first terminal device 10 and a second terminal device 10).

First, the first terminal device 10 and the multifunction peripheral 20 perform a process from S1000 to S1010. By this, the multifunction peripheral 20 maintains a state in which a reconnection request from the first terminal device 10 is acceptable (a communication acceptable state).

On the other hand, the second terminal device 10 receives a remote operation start request (S3000) and executes handshake based on a QUIC protocol (QUIC Handshake) with the multifunction peripheral 20 so as to establish a connection (S3002).

The multifunction peripheral 20 stores Connection ID and TLS key information associated with communication with the second terminal device 10 (53004). Similarly, the second terminal device 10 stores Connection ID and the TLS key information (S3006). The process from step S3000 to step S3006 is the same as the process from step S1000 to step S1006.

Subsequently, the multifunction peripheral 20 determines whether a setting for permitting execution of a remote operation or a job by another user when the communication with the terminal device 10 is interrupted has been made (S3008). In a case where execution of a remote operation or a job by another user is not permitted when the communication with the terminal device 10 is interrupted, the multifunction peripheral 20 issues a busy notification to the second terminal device 10 (S3008: No→S3010), The busy notification indicates that a remote operation may not be performed because another user is using the multifunction peripheral 20, The second terminal device 10 which has received the busy notification displays on the display 140 a message indicating that another user is using the multifunction peripheral 20 (S3012).

On the other hand, in a case where execution of a remote operation or a job by another user is permitted when the communication with the terminal device 10 is interrupted, the multifunction peripheral 20 starts communication with the second terminal device 10 and then performs communication of transmission/reception information (Application Data) using the Connection IDs and the MS key information (S3008; Yes→S3014), By this, the second terminal device 10 can perform a remote operation (S3016). Note that the second terminal device 10 terminates the remote operation by performing a termination process on the multifunction peripheral 20. In the termination process, information indicating termination of the remote operation (Application Data) is transmitted, for example (S3017). In this case, the second terminal device 10 may be disconnected from the multifunction peripheral 20. By this, use of the multifunction peripheral 20 by the user who is using the second terminal device 10 is terminated.

On the other hand, in a case where a change in an IP address of the first terminal device 10 is completed while the second terminal device 10 performs a remote operation or in a case where a network of the first terminal device 10 is restored, the first terminal device 10 issues a reconnection request to the multifunction peripheral 20 (S1014). The multifunction peripheral 20 specifies a job in a reconnection standby state using the multifunction peripheral Connection ID received from the first terminal device 10 and the TLS key information corresponding to the multifunction peripheral Connection ID (S1016). Therefore, the multifunction peripheral 20 can recognize that the remote operation is being performed again by the first terminal device 10 whose communication was disconnected.

When another user uses the multifunction peripheral 20, the multifunction peripheral 20 transmits a busy notification to the first terminal device 10 (S301.8: Yes→S3020). The first terminal device 10 which has received the busy notification displays on the display 140 a message indicating that another user is using the multifunction peripheral 20 (S3022). At this time, the multifunction peripheral 20 determines a user of the first terminal device 10 which has performed the reconnection when another user uses the multifunction peripheral 20 as a standby user. Accordingly, the multifunction peripheral 20 causes the first terminal device 10 to enter a remote operation standby state.

On the other hand, when another user is not using the multifunction peripheral 20, the multifunction peripheral 20 performs the reconnection process with the terminal device 10 without a busy notification and resumes the communication of the transmission/reception information (S3018; No→S1018→S1020).

Furthermore, when the remote operation is terminated, the multifunction peripheral 20 determines whether a user is in a standby state (S3024). When a user is in a standby mode, the multifunction peripheral 20 executes the reconnection process to the terminal device 10 used by the standby user (the first terminal device 10 in the remote operation standby state) (S3024; Yes→S1018). At this time, the multifunction peripheral 20 may notify the terminal device 10 that the operation by the other user has been terminated (an operation termination notification). When the multifunction peripheral 20 issues the operation termination notification, the terminal device 10 and the multifunction peripheral 20 may execute the reconnection process.

As a result, the first terminal device 10 and the multifunction peripheral 20 resume communication of certain information (S1020). Furthermore, the first terminal device 10 becomes available for the remote operation (S1022).

3.2 Process of Terminal Device

A flow of a process performed by the terminal device 10 according to this embodiment will be described with reference to FIG. 21.

In this embodiment, the controller 100 determines whether a busy notification has been issued from the multifunction peripheral 20 after executing the process in step S104 (step S300). When the busy notification has issued, the controller 100 displays a message indicating that another user is using the multifunction peripheral 20 on the display 140 (step S300; Yes→step S302) and terminates the process illustrated in FIG. 21. In this case, the controller 100 may execute the process from step S100 again. Note that the controller 100 starts a remote operation when the busy notification has not been issued (step S300; No step S106).

Furthermore, the controller 100 determines whether a busy notification has been issued from the multifunction peripheral 20 after executing the process in step S114 (step S304). When a busy notification has been issued, the controller 100 displays a message indicating that another user is using the multifunction peripheral 20 on the display 140 (step S304; Yes→step S306). Note that the controller 100 executes the reconnection process when a busy notification has not been issued (step S304; No→step S116).

Then, the controller 100 determines whether the multifunction peripheral 20 has issued a notification indicating that the operation of the multifunction peripheral 20 by the other user has been terminated (step S308). When receiving the operation termination notification indicating that the operation on the multifunction peripheral 20 by the other user is terminated from the multifunction peripheral 20, the controller 100 executes the reconnection process (step S308; Yes→step S116). Note that, when the operation termination notification has not been issued, the controller 100 repeatedly performs the process in step S308 until the operation termination notification is issued (step S308; No).

According to the process described above, the controller 100 can wait until the operation termination notification is issued when the busy notification is issued in the reconnection to the multifunction peripheral 20 and execute the reconnection process when the operation termination notification is issued.

3.3 Process of Multifunction Peripheral

Figure 23:
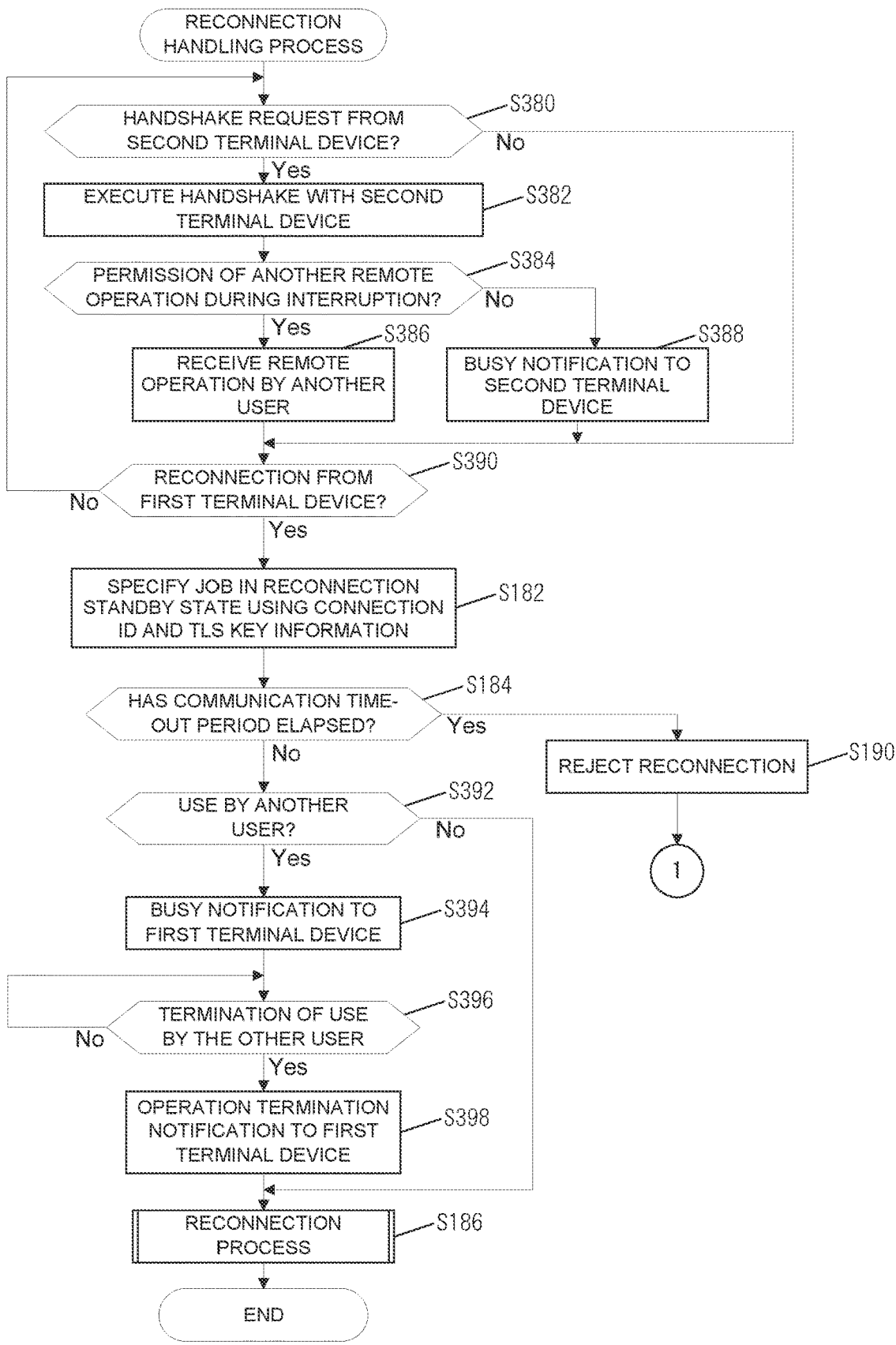
FIG. 23 is a flowchart of a flow of a reconnection handling process according to the third embodiment.

A flow of a process performed by the multifunction peripheral 20 according to this embodiment will be described with reference to FIGS. 22 and 23. First, a process illustrated in FIG. 22 will be described.

The controller 200 determines whether another user is using the multifunction peripheral 20 after executing a process in step S152 (step S350). When another user is using the multifunction peripheral 20, the controller 200 transmits a busy notification to the terminal device 10 which has performed handshake (step S350; Yes→step S356).

Furthermore, another user is not using the multifunction peripheral 20, the controller 200 determines whether there is a user whose communication based on a remote operation is interrupted (step S350; No→step S352). For example, when a remote operation is interrupted, the controller 200 stores information indicating that a remote operation has been interrupted in the storage 260, The controller 200 determines that there is a user in interruption when the information indicating that a remote operation has been interrupted is stored in the storage 260.

When there is a user in interruption, the controller 200 determines whether execution of a remote operation or a job by another user is permitted (step S352; Yes→step S354). In a case where execution of a remote operation or a job by another user is not permitted, the controller 200 issues a busy notification to the terminal device 10 which has performed the handshake (S354: No→step S356).

Note that when there is no user in interruption, the controller 200 starts reception of a remote operation from the terminal device 10 that has performed the handshake (step S352; No→step S154). Furthermore, in a case where execution of a remote operation or a job by another user is permitted in interruption even when there is a user in interruption, the controller 200 starts reception of a remote operation performed by the terminal device 10 which has performed the handshake (step S354; Yes→step S154).

Next, the reconnection handling process executed by the multifunction peripheral 20 of this embodiment will be described with reference to FIG. 23. Note that, in a description with reference to FIG. 23, the terminal device 10 whose connection has been interrupted is referred to as a first terminal device 10, and the other terminal device 10 which is different from the first terminal device 10 is referred to as a second terminal device 10.

First, the controller 200 determines whether handshake is requested by the second terminal device 10 (step S380). When handshake is requested, the multifunction peripheral 20 performs handshake with the second terminal device 10 (step S380; Yes→step S382).

Subsequently, when there is a user in interruption, the controller 200 determines whether execution of a remote operation or a job by another user is permitted (step S384). When execution of a remote operation or a job by another user is permitted, the controller 200 accepts a remote operation performed by a user using the second terminal device 10 (another user) (step S384; Yes→step S386). On the other hand, when execution of a remote operation or a job by another user is not permitted, the controller 200 issues a busy notification to the second terminal device 10 (step S384; No→step S388).

Note that, when determining in step S380 that handshake is not requested by the second terminal device 10, the controller 200 omits the process from step S382 to step S388 (step S380; No).

Subsequently, the controller 200 determines whether a reconnection is attempted by the first terminal device 10 (step S390). When the reconnection is not attempted, the controller 200 returns to step S380 (step S390; No→step S380). On the other hand, when the reconnection is attempted by the first terminal device 10, the controller 200 specifies a job in a reconnection standby state using Connection ID received from the first terminal device 10 and TLS key information of the first terminal device 10 (step S390; Yes→step S182).

Thereafter, the controller 200 determines whether a communication time-out period set for the first terminal device 10 that attempts the reconnection has elapsed (step S184). When the communication time-out period has elapsed, the controller 200 rejects the reconnection from the first terminal device 10 (step S184; Yes→step S190). On the other hand, when the communication time-out period has not elapsed, the controller 200 determines whether another user is using the multifunction peripheral 20 (step S1849; No→step S392).

When another user is using the multifunction peripheral 20, the controller 200 transmits a busy notification to the first terminal device 10 (step S392; Yes→step S394). Furthermore, the controller 200 determines whether the use of the multifunction peripheral 20 by the other user has been terminated (step S396). When the use of the multifunction peripheral 20 by the other user has not been terminated, the controller 200 repeatedly performs the process in step S396 (step S396; No). On the other hand, when the use of the multifunction peripheral 20 by the other user is terminated, the controller 200 transmits an operation termination notification to the first terminal device 10 (step S396; Yes→step S398).

Note that, when it is determined that another user is using the multifunction peripheral 20 in step S392, the process from step S394 to step S398 described above is omitted and the controller 200 executes the reconnection process in step S186 (step S392; No→step S186). In this case, the controller 200 does not issue a busy notification to the first terminal device 10. As a result, when the reconnection is performed from the first terminal device 10 to the multifunction peripheral 20, the reconnection process is simply executed between the first terminal device 10 and the multifunction peripheral 20.

With the above-described process, when remote operations are performed by the first terminal device 10 and the second terminal device 10, the multifunction peripheral 20 can start the remote operations and issue a busy notification based on a state or settings of communication with the first terminal device 10.

As described above, the terminal device and the in peripheral in this embodiment can appropriately perform a remote operation when the remote operation is started by another user when communication is interrupted.

4. Modifications

The present disclosure is not limited to the above-described embodiments, and various modifications may be made. That is, the technical scope of the present disclosure also includes an embodiment acquired by combining technical measures properly changed in a range not departing from the scope of the present disclosure.

Furthermore, some parts of the above-described embodiments are separately described for convenience of description but may be obviously implemented in combination within a technically allowable range. For example, the second embodiment and the third embodiment may be combined. In this case, when communication with a multifunction peripheral is resumed, a terminal device may execute a process in accordance with a state of the multifunction peripheral. Furthermore, the terminal device and the multifunction peripheral can appropriately cope with remote operations performed by a plurality of users.

In addition, programs to be operated on the individual devices in the embodiments control a CPU or the like (i.e., programs which make a computer function) so as to implement the functions of the above-described embodiments. The information handled by these devices is temporarily accumulated in a temporary storage device (for example, a RAM) during the processing, is then stored in various storage devices, such as a ROM (Read Only Memory) and an HDD, and is read, corrected, and written by the CPU as needed.

Here, a recording medium that stores the program may be, for example, any of a semiconductor medium (for example, a ROM and a non-volatile memory card), an optical recording medium/magneto-optical recording medium (for example, a digital versatile disk (DVD), a magneto optical disk (MO), a Mini Disk (MD), a compact disk (CD), and a Blu-ray (registered trademark) Disc (BD)), and a magnetic recording medium (for example, a magnetic tape and a flexible disk). Furthermore, not only are the functions of the foregoing embodiments implemented through execution of the loaded program, but the functions of the present disclosure may also be implemented through processing performed in cooperation with, for example, an operating system or other application programs on the basis of instructions of the program.

Furthermore, when the program is to be distributed to the market, the program may be stored in a portable recording medium for distribution and transferred to a server computer connected via a network, such as the Internet. In this case, a storage device of the server computer is also included in the present disclosure as a matter of course.

What is claimed is:

1. An image-forming apparatus, comprising:
a controller;
a storage; and
a communicator, wherein
the controller
establishes a connection with a terminal device through the communicator using Quick UDP Internet Connections (QUIC),
stores, in the storage, identification information for identifying the connection and key information to be used for encryption of transmission-reception information transmitted and received to and from the terminal device,
performs communication of the transmission-reception information with the terminal device through Hypertext Transfer Protocol (HTTP)/3, and
establishes, when the connection with the terminal device is disconnected, a reconnection with the terminal device using the identification information and the key information, such that the communication of the transmission-reception information with the terminal device is resumed.

2. The image-forming apparatus according to claim 1, wherein the key information is information on a common key used for communication using a TLS (Transport Layer Security) protocol.

3. The image-forming apparatus according to claim 1, wherein the controller further
stores the identification information, the key information, and the transmission-reception information received from the terminal device that are associated with one another, and
resumes, when the communication with the terminal device is resumed, communication of the transmission-reception information that is associated with the identification information and the key information.

4. The image-forming apparatus according to claim 1, wherein, when the connection with the terminal device is disconnected, the controller sets a period of time for accepting the reconnection from the terminal device, and the controller rejects a resumption of the communication of the transmission-reception information with the terminal device when the reconnection is attempted by the terminal device after the period of time has elapsed.

5. The image-forming apparatus according to claim 1, wherein
the communicator communicates with a plurality of terminal devices including the terminal devices, and
the controller further establishes a connection with a second terminal device when a connection with a first terminal device is disconnected after the connection with the first terminal device is established, performs communication of transmission-reception information with the second terminal device, establishes a reconnection with the first terminal device after the connection with the second terminal device is disconnected, and performs communication of the transmission-reception information with the first terminal device.

6. The image-forming apparatus according to claim 5, wherein, when the connection with the first terminal device is disconnected after the connection with the first terminal device is established and the communication of the transmission-reception information is performed after the connection with the second terminal device is established, and when the first terminal device requests establishment of the reconnection, the controller notifies the first terminal device of a usage of the image-forming apparatus by user.

7. A terminal device comprising:
a controller;
a storage; and
a communicator, wherein
the controller
establishes a connection with the image-forming apparatus through the communicator using Quick UDP Internet Connections (QUIC),
stores, in the storage, identification information for identifying the connection and key information to be used for encryption of transmission-reception information transmitted and received to and from the image-forming apparatus,
performs communication of the transmission-reception information with the image-forming apparatus through Hypertext Transfer Protocol (HTTP)/3, and
performs, when the connection with the image-forming apparatus is disconnected, a
reconnection to the image-forming apparatus using the identification information and the key information so as to resume the communication of the transmission-reception information with the image-forming apparatus.

8. The terminal device according to claim 7, wherein, when resuming the communication of the transmission-reception information with the image-forming apparatus, the controller performs control, such that a message based on a state of the image-forming apparatus is displayed.

9. A method for controlling an image-forming apparatus, the method comprising:
establishing a connection with a terminal device by using Quick UDP Internet Connections (QUIC);
storing identification information for identifying the connection and key information to be used for encryption of transmission-reception information transmitted and received to and from the terminal device;
performing communication of the transmission-reception information with the terminal device through Hypertext Transfer Protocol (HTTP)/3; and
establishing, when the connection with the terminal device is disconnected, a reconnection with the terminal device using the identification information and the key information, such that the communication of the transmission-reception information with the terminal device is resumed.

10. A method for controlling a terminal device, the method comprising:
establishing a connection with an image-forming apparatus using Quick UDP Internet Connections (QUIC);
storing identification information for identifying the connection and key information to be used for encryption of transmission-reception information transmitted and received to and from the image-forming apparatus;
performing communication of the transmission-reception information with the image-forming apparatus through Hypertext Transfer Protocol (HTTP)/3; and performing, when the connection with the image-forming apparatus is disconnected, a reconnection to the image-forming apparatus using the identification information and the key information, such that the communication of the transmission-reception information with the image-forming apparatus is resumed.

* * * * *